(12) United States Patent
Poole

(10) Patent No.: US 12,392,917 B2
(45) Date of Patent: *Aug. 19, 2025

(54) DEVICE AND METHOD FOR WAVE-FIELD RECONSTRUCTION

(71) Applicant: CGG SERVICES SA, Massy (FR)

(72) Inventor: Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,918

(22) Filed: Feb. 2, 2024

(65) Prior Publication Data

US 2024/0192392 A1 Jun. 13, 2024

Related U.S. Application Data

(63) Continuation of application No. 17/752,913, filed on May 25, 2022, now Pat. No. 11,927,710, which is a
(Continued)

(51) Int. Cl.
*G01V 1/36* (2006.01)
*G01V 1/28* (2006.01)
(Continued)

(52) U.S. Cl.
CPC .............. *G01V 1/36* (2013.01); *G01V 1/282* (2013.01); *G01V 1/30* (2013.01); *G01V 1/38* (2013.01);
(Continued)

(58) Field of Classification Search
CPC . G01V 1/36; G01V 1/282; G01V 1/30; G01V 1/38; G01V 2210/1293;
(Continued)

(56) References Cited

U.S. PATENT DOCUMENTS

| 4,992,992 | A | 2/1991 | Dragoset, Jr. |
| 7,715,988 | B2 | 5/2010 | Robertsson et al. |

(Continued)

FOREIGN PATENT DOCUMENTS

| AU | 2018222932 A1 | 3/2019 |
| WO | 2013093063 A1 | 6/2013 |

OTHER PUBLICATIONS

European Office Action in corresponding/related European Application No. 14 720 585.0 dated Jan. 14, 2021.
(Continued)

*Primary Examiner* — Tung S Lau
(74) *Attorney, Agent, or Firm* — PATENT PORTFOLIO BUILDERS PLLC

(57) ABSTRACT

Computing device, computer instructions and method for processing input seismic data d associated with a surveyed subsurface. The method includes: receiving the input seismic data d recorded in a first domain by seismic receivers that travel in water, the input seismic data d including pressure data and particle motion data; generating a model p in a second domain, which is different from the first domain, to describe the input seismic data d; processing the model p to generate an output seismic dataset with attenuated noise; and generating an image of the surveyed subsurface based on the output seismic dataset.

15 Claims, 29 Drawing Sheets

Related U.S. Application Data continuation of application No. 17/070,005, filed on Oct. 14, 2020, now Pat. No. 11,415,718, which is a continuation of application No. 15/275,818, filed on Sep. 26, 2016, now abandoned, which is a continuation of application No. 14/678,099, filed on Apr. 3, 2015, now Pat. No. 9,535,181, which is a continuation of application No. PCT/EP2014/058623, filed on Apr. 28, 2014.

(60) Provisional application No. 61/931,196, filed on Jan. 24, 2014, provisional application No. 61/911,574, filed on Dec. 4, 2013, provisional application No. 61/824,521, filed on May 17, 2013, provisional application No. 61/824,040, filed on May 16, 2013, provisional application No. 61/817,193, filed on Apr. 29, 2013.

(51) Int. Cl.
   *G01V 1/30* (2006.01)
   *G01V 1/38* (2006.01)

(52) U.S. Cl.
   CPC ............... *G01V 2210/1293* (2013.01); *G01V 2210/1423* (2013.01); *G01V 2210/32* (2013.01); *G01V 2210/47* (2013.01); *G01V 2210/56* (2013.01)

(58) Field of Classification Search
   CPC ....... G01V 2210/1423; G01V 2210/32; G01V 2210/47; G01V 2210/56
   See application file for complete search history.

(56) References Cited

U.S. PATENT DOCUMENTS

| | | |
|---|---|---|
| 7,725,266 B2 | 5/2010 | Sirgue et al. |
| 8,352,190 B2 | 1/2013 | Baumstein et al. |
| 8,395,966 B2 | 3/2013 | Moore et al. |
| 8,456,951 B2 | 6/2013 | Soubaras |
| 9,535,181 B2 * | 1/2017 | Poole ..................... G01V 1/282 |
| 11,415,718 B2 * | 8/2022 | Poole ....................... G01V 1/38 |
| 11,927,710 B2 * | 3/2024 | Poole ....................... G01V 1/36 |
| 2004/0064294 A1 | 4/2004 | Riel et al. |
| 2004/0220743 A1 | 11/2004 | Sahai et al. |
| 2005/0013194 A1 | 1/2005 | Vaage et al. |
| 2007/0282535 A1 | 12/2007 | Sirgue et al. |
| 2008/0294346 A1 | 11/2008 | Nemeth et al. |
| 2009/0067285 A1 | 3/2009 | Robertsson et al. |
| 2009/0279387 A1 | 11/2009 | Tenghamn et al. |
| 2009/0326895 A1 | 12/2009 | Beasley |
| 2010/0008184 A1 | 1/2010 | Hegna et al. |
| 2010/0097886 A1 | 4/2010 | Day et al. |
| 2010/0118650 A1 | 5/2010 | Eick et al. |
| 2010/0124148 A1 | 5/2010 | Kluver et al. |
| 2010/0271904 A1 | 10/2010 | Moore et al. |
| 2011/0134721 A1 * | 6/2011 | Deffenbaugh ........... G01V 1/28 367/43 |
| 2011/0213556 A1 | 9/2011 | Yu et al. |
| 2011/0242937 A1 | 10/2011 | Söllner et al. |
| 2011/0292762 A1 | 12/2011 | Ozdemir et al. |
| 2013/0021873 A1 | 1/2013 | Mattocks et al. |
| 2013/0088939 A1 | 4/2013 | Edme et al. |
| 2013/0163376 A1 | 6/2013 | Poole |
| 2013/0163379 A1 | 6/2013 | Poole |
| 2013/0242696 A1 * | 9/2013 | van Groenestijn .... G01V 1/368 367/24 |
| 2014/0016436 A1 | 1/2014 | Söllner et al. |
| 2016/0161621 A1 | 6/2016 | Salama et al. |
| 2017/0299746 A1 * | 10/2017 | Hegna ................... G01V 1/364 |

OTHER PUBLICATIONS

International Search Report/Written Opinion dated Dec. 5, 2014 in related/corresponding PCT Application No. PCT/EP2014/058623.

Obliquity I Definition of Obliquity by Merriam-Webster, p. 1, printed Mar. 24, 2017.

Office Action mailed Feb. 4, 2016 in related U.S. Appl. No. 14/678,099.

Office Action mailed Oct. 19, 2015 in related U.S. Appl. No. 14/678,099.

* cited by examiner

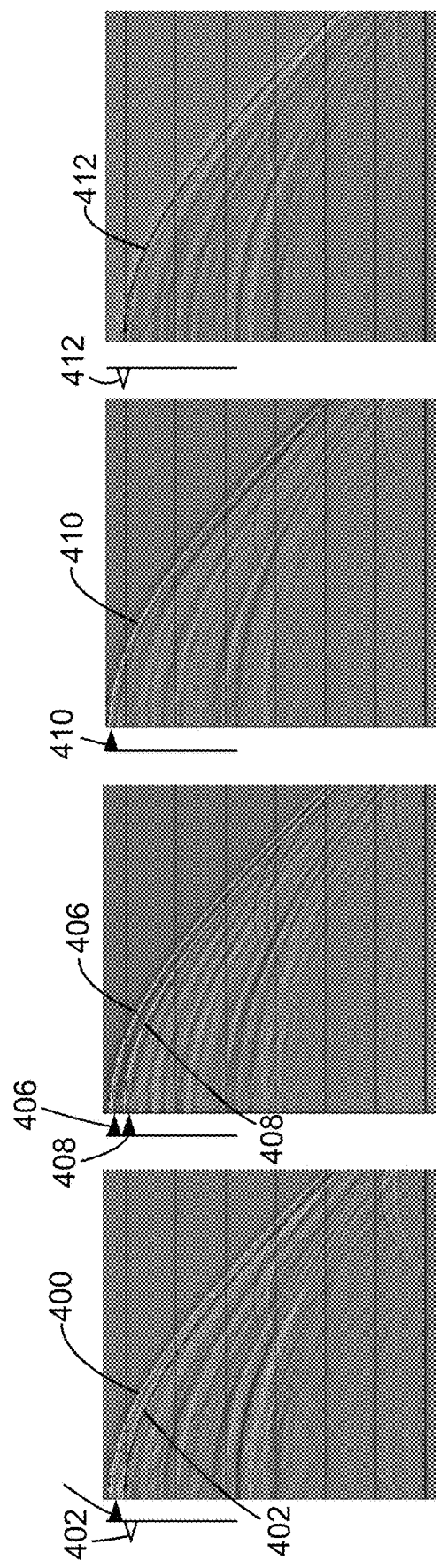

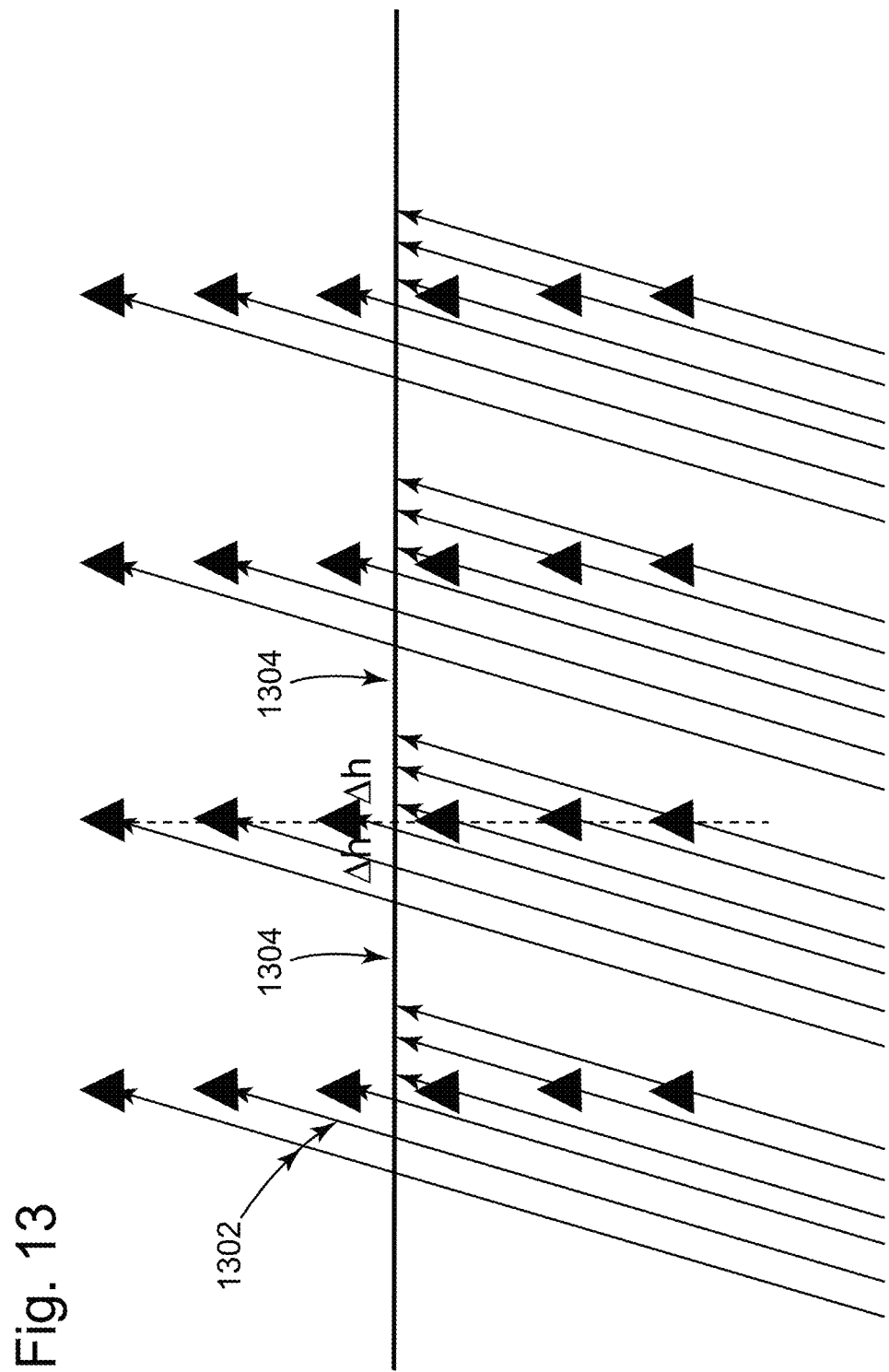

DEVICE AND METHOD FOR WAVE-FIELD RECONSTRUCTION

CROSS-REFERENCE TO RELATED APPLICATIONS

This application is a Continuation Application of U.S. patent application Ser. No. 17/752,913, filed on May 25, 2022, which is a Continuation Application of U.S. patent application Ser. No. 17/070,005, filed on Oct. 14, 2020, now U.S. Pat. No. 11,415,718, which is a Continuation Application of U.S. patent application Ser. No. 15/275,818, filed on Sep. 26, 2016, abandoned, which is a Continuation Application of U.S. patent application Ser. No. 14/678,099, filed on Apr. 3, 2015, now U.S. Pat. No. 9,535,181, which is a Continuation Application of International Application No. PCT/EP2014/058623 filed on Apr. 28, 2014, which claims priority and benefit from U.S. Provisional Application 61/817,193, filed Apr. 29, 2013, titled, "Deghost, Redatum, and Interpolation using Multi-component Streamer Data," and authored by G. Poole; U.S. Provisional Application 61/824,040, filed May 16, 2013, titled, "Deghost, Redatum, and Interpolation using Multi-component Streamer Data," and authored by G. Poole; U.S. Provisional Application 61/824,521, filed May 17, 2013, titled, "Deghost, Redatum, and Interpolation using Multi-component Streamer Data," and authored by G. Poole; U.S. Provisional Application 61/911,574, filed Dec. 4, 2013, titled, "Deghost, Redatum, and Interpolation using Multi-component Streamer Data," and authored by G. Poole; and U.S. Provisional Application 61/931,196, filed Jan. 24, 2014, titled, "Deghost, Redatum, and Interpolation using Multi-component Streamer Data," and authored by G. Poole, the entire contents of which are incorporated herein by reference.

BACKGROUND

Technical Field

Embodiments of the subject matter disclosed herein generally relate to methods and systems and, more particularly, to mechanisms and techniques for reconstructing wavefields (e.g., deghosting, redatuming, denoising, interpolating, etc.) based on seismic data collected with receivers located either on streamers or on or close to the ocean bottom.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 110 tows plural detectors 112, which are disposed along a cable 114. Cable 114 together with its corresponding detectors 112 are sometimes referred to, by those skilled in the art, as a streamer 116. Vessel 110 may tow plural streamers 116 at the same time. Streamers may be disposed horizontally, i.e., lie at a constant depth $z_1$ relative to the ocean surface 118. Also, plural streamers 116 may form a constant angle (i.e., the streamers may be slanted) with respect to the ocean surface as disclosed in U.S. Pat. No. 4,992,992, the entire content of which is incorporated herein by reference.

Still with reference to FIG. 1, vessel 110 may also tow a seismic source 120 configured to generate an acoustic wave 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic wave. Parts of reflected acoustic wave 122b (primary) are recorded by various detectors 112 (recorded signals are called traces) while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave because it is due to a spurious reflection. Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

Recorded traces may be used to determine the subsurface (i.e., earth structure below surface 124) and to determine the position and presence of reflectors 126. However, ghosts disturb the accuracy of the final image of the subsurface and, for at least this reason, various methods exist for removing ghosts, i.e., deghosting, from the acquired seismic data. These methods were designed for deghosting seismic data recorded with horizontal or slanted streamers.

The above-discussed methods are not appropriate for seismic data collected with new streamer configurations, e.g., having a curved profile as illustrated in FIG. 2. Deghosting methods for streamers having a curved profile have recently been developed, mainly by the assignee of this application, as later discussed. Such a configuration has a streamer 252 with a curved profile. The curved profile may have any shape. One example of a curved profile is defined by three parametric quantities, $z_0$, $s_0$ and $h_c$. Note that not the entire streamer has to have the curved profile. The first parameter $z_0$ indicates the depth of the first detector 254a relative to the water's surface 258. Second parameter $s_0$ is related to the slope of the initial part of streamer 252 relative to a horizontal line 264. The example shown in FIG. 2 has initial slope so equal to substantially 3 percent. Other values may be used. Note that the streamer 252 profile in FIG. 2 is not drawn to scale because a slope of 3 percent is relatively slight. Third parameter $h_c$ indicates a horizontal length (distance along the X axis in FIG. 2 measured from first detector 254a) of the streamer's curved portion. This parameter may be in the range of hundreds to thousands of meters.

For such streamers, a deghosting process has been disclosed, for example, in U.S. Pat. No. 8,456,951 (herein '951) authored by R Soubaras, the entire content of which is incorporated herein. According to the '951 patent, a method for deghosting uses joint deconvolution for migration and mirror migration images to generate a final image of a subsurface. Deghosting is performed at the end of processing (during an imaging phase) and not at the beginning, as with traditional methods. Further, the '951 patent discloses that no datuming step is performed on the data.

Another method that addresses variable-depth data is disclosed by U.S. patent application Ser. No. 13/334,776 (herein '776) authored by G. Poole. This method uses a surface datum tau-p model that represents input shot data. A transform from the tau-p model to a shot domain (offset-time) combines the operations of redatuming and reghosting. The use of variable-depth streamer data combined with reghosting ensures that a single point in the tau-p domain satisfies a range of different ghost lags, therefore, making use of variable-depth data notch diversity, which ensures effective receiver deghosting.

FIG. 3 illustrates how one point 302 in the tau-p domain 320 reverse transforms to a pair of lines 304 and 306 in time-space domain 310, at actual streamer position and mirror streamer datum, respectively. The energy relating to mirror cable datum has reverse polarity (−1) compared to the cable datum (+1) as also illustrated in FIG. 3. Note that the time-space (or time-offset) domain 310 has time t on the vertical axis, and offset h between the receiver recording the wave and the source generating the wave, along the X axis, while tau-p domain 320 has the tau coordinate (intercept in the time-space domain) along the Y axis, and the p coordinate (slope in the time-space domain) along the X axis. Application '776 uses a least squares formulation given by:

$$d = Lp \quad (1)$$

or, in the expanded matrix form, $$\begin{pmatrix} d_1 \\ d_2 \\ d_N \end{pmatrix} = \begin{pmatrix} e^{-2\pi i f \tau_{pr}} - e^{-2\pi i f \tau_{gh}} \end{pmatrix} \begin{pmatrix} p_1 \\ p_2 \\ p_3 \\ p_M \end{pmatrix}, \quad (2)$$

where column vector d contains a frequency slice from the shot domain data (known), column vector p contains the surface datum tau-p model (unknown), and matrix L makes the transform (known) from the surface tau-p model to the input shot data. Matrix L combines the operations of redatuming and reghosting.

The time shifts for primary (up-going) and ghost (down-going) wave fields are given by:

$$\tau_{pr} = (h_n + \Delta h)s_m - \Delta\tau \quad (3)$$

$$\tau_{gh} = (h_n - \Delta h)s_m + \Delta\tau, \quad (4)$$

where $h_n$ is the offset of a given trace in column vector d, $s_m$ is the slowness of a given trace in the surface tau-p model, $\Delta h$ is the offset perturbation as described in the '776 application, and $\Delta t$ is the temporal perturbation as also described in the '776 application. Equation (1) can be solved in the time or spectral (e.g., frequency) domain using linear inversion. The method can be applied on the whole shot (cable-by-cable) or in spatial windows of a user-defined number of channels.

However, existing methods relate to pressure measurements made, for example, by hydrophones. Currently, the new streamer generation is capable of measuring not only pressure but also particle motion data, e.g., displacement, velocity, differential pressure, acceleration, etc. Thus, there is a need to process not only pressure measurements, but also particle motion data. Accordingly, it would be desirable to provide systems and methods with such capabilities.

SUMMARY

According to an embodiment, there is a method for processing input seismic data d. The method includes receiving the input seismic data d recorded in a first domain by seismic receivers that travel in water, the input seismic data d including up-going and down-going wave-fields; generating a model p in a second domain to describe the input seismic data d; and processing with a processor the model p to obtain an output seismic dataset indicative of the down-going wave-field and substantially free of the up-going wave-field.

According to another embodiment, there is method for processing input seismic data d. The method includes receiving the input seismic data d recorded in a first domain by seismic receivers that travel in water; generating a model p in a second domain, at a datum different from the input seismic data d, to describe the input seismic data d; and processing in a processor the model p to obtain an output seismic dataset indicative of a pressure wave-field.

According to another embodiment, there is a method for processing input seismic data d. The method includes receiving the input seismic data d recorded in a first domain by seismic receivers that travel in water, the input seismic data d including pressure and particle motion measurements; generating a model p in a second domain to describe the input seismic data d, wherein the model p is obtained by solving an inverse problem based on an L transform; and processing, in a processor, with a mathematical transform L' the model p to obtain, in the first domain, an output seismic data having a characteristic imparted by the transform L'. The mathematical transform L' is different from the mathematical transform L.

According to another embodiment, there is a method for processing input seismic data d. The method includes receiving the input seismic data d recorded in a first domain by seismic receivers that travel in water, wherein the input seismic data includes both pressure and particle motion measurements; generating a model p in a second domain to describe the input seismic data d; and processing with a processor the model p to separate multiples and primaries in the second domain, wherein the multiples is multiple energy reflected at the free surface or rock interface layers in the subsurface.

According to another embodiment, there is a method for processing input seismic data d. The method includes receiving the input seismic data d recorded by seismic receivers that travel in water, the input seismic data d including particle motion measurements; receiving receiver orientation data that is indicative of seismic receiver orientations; associating the particle motion measurements with the receiver orientation data; and generating with a processor an output seismic data based on the association of the particle motion measurements with the receiver orientation data. The seismic receiver orientations vary in time and the output seismic data includes a wavefield reconstruction of the input dataset.

According to another embodiment, there is a method for processing input seismic data d. The method includes receiving the input seismic data d recorded, in a first domain, by seismic receivers that travel in water, the input seismic data d including pressure and particle motion measurements; generating a model p in a second domain to describe the input seismic data d; and processing in a processor the model p to generate an output seismic dataset with attenuated noise.

According to another embodiment, there is a method for processing input seismic data d. The method includes receiving the input seismic data d recorded, in a first domain, by seismic receivers that travel in water; generating a model p in a second domain to describe the input seismic data d; and processing with a processor the model p to generate a output particle motion dataset.

According to another embodiment, there is a method for processing input seismic data d. The method includes receiving the input seismic data d recorded, at a first datum, in a first domain, by seismic receivers that travel in water, the input seismic data d including up-going and down-going wave-fields; generating a model p in a second domain to describe the input seismic data d; and processing with a processor the model p to obtain an output seismic dataset at a second datum, different from the first datum.

According to still another embodiment, there are computing systems and computer-readable mediums including computer executable instructions, wherein the instructions, when executed by a processor, implement one or more of the methods as noted in the above paragraphs.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4A-C illustrate input multicomponent data and FIG. 4D illustrates output deghosted data;

FIG. 13 illustrates inconsistent spatial sampling for output data with redatuming;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to pressure and particle velocity measurements associated with seismic data. However, the embodiments to be discussed next are not limited to these measurements. Other measurements, e.g., particle displacement and/or particle acceleration measurements, may be used instead of or in addition to particle velocity measurements. Thus, a generic name for velocity, displacement, pressure gradient, and acceleration measurements is particle motion data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, hydrophone and vertical particle velocity receiver data collected from receivers (located on streamer, ocean bottom cable, autonomous vehicles, etc.) are processed as now discussed.

Figure 1:
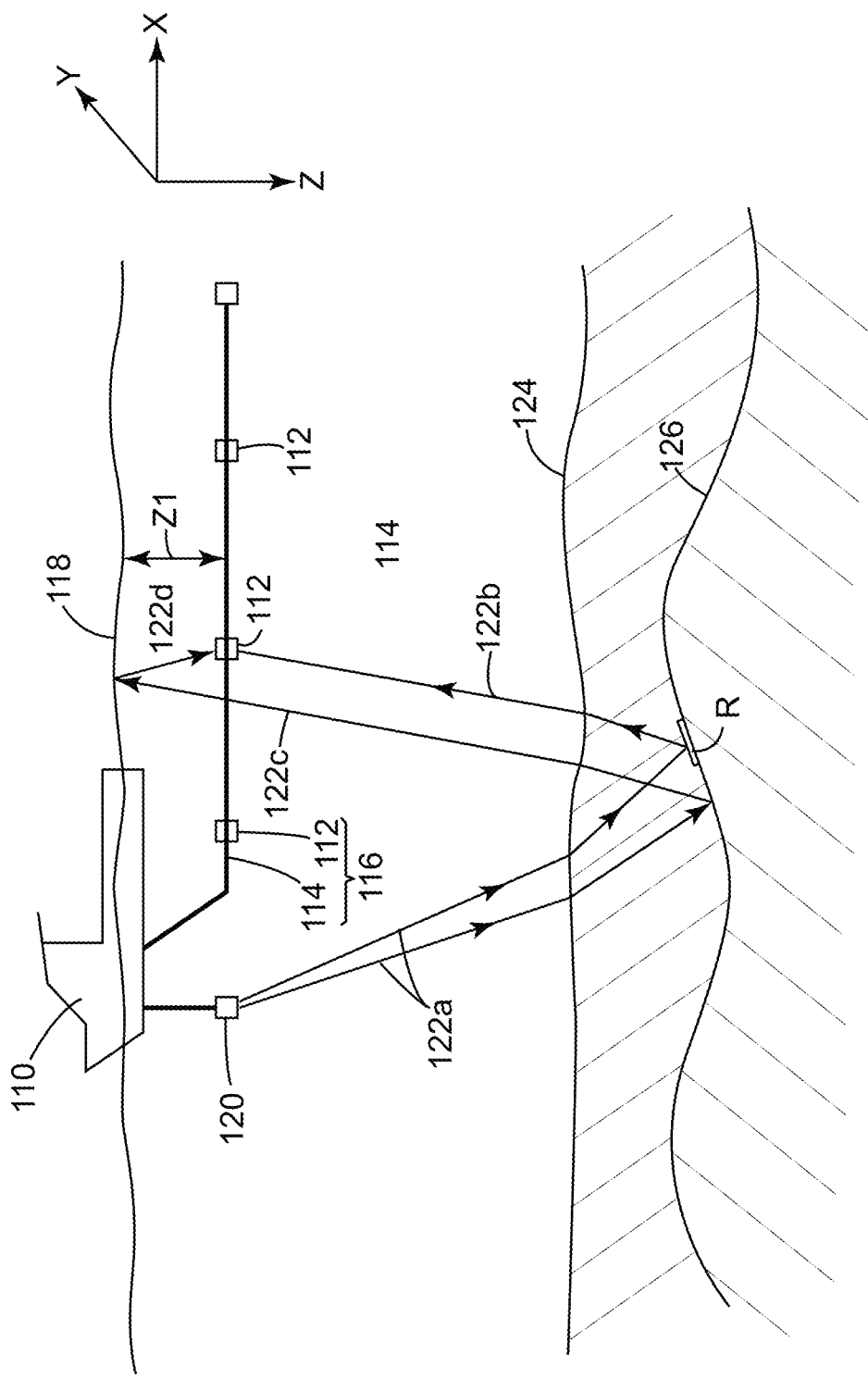
FIG. 1 is a schematic diagram of a conventional seismic data acquisition system having a horizontal streamer.
Figure 2:
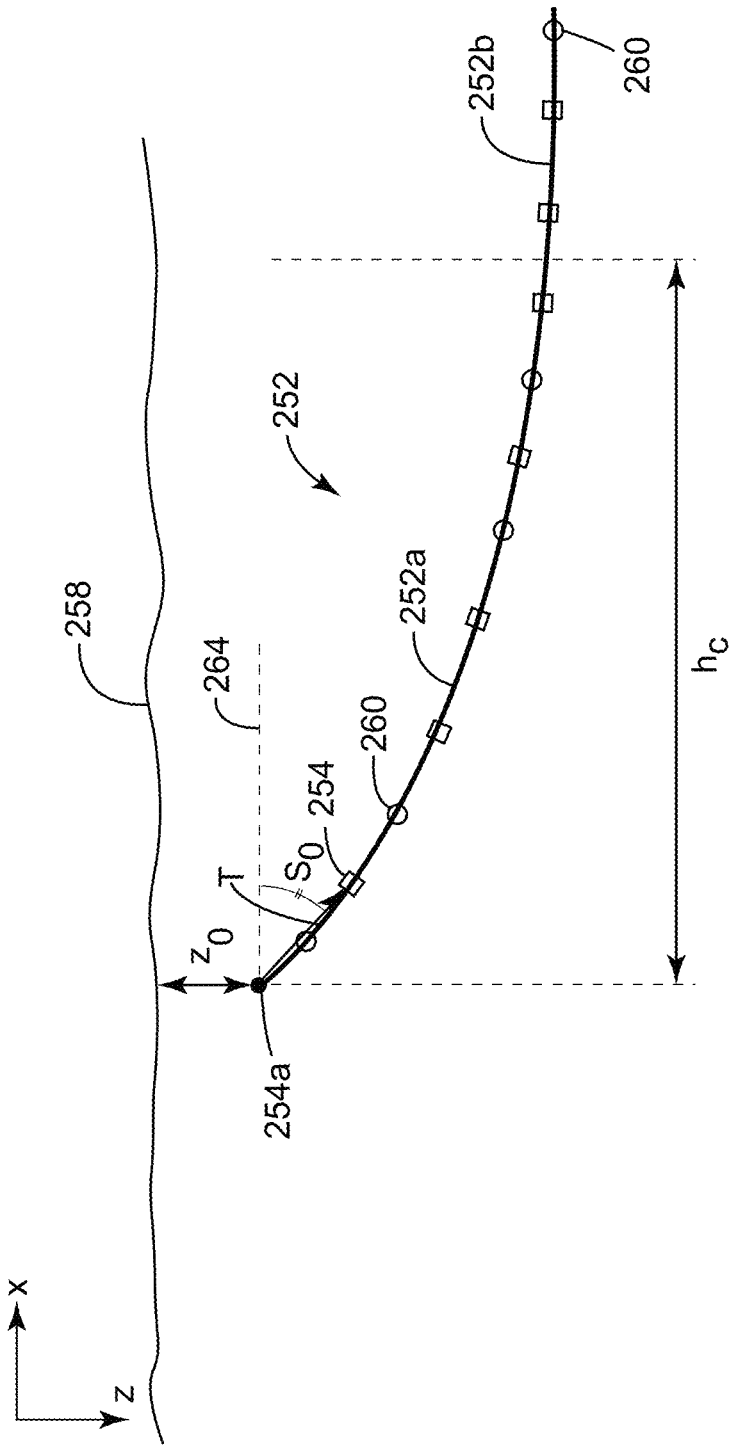
FIG. 2 is a schematic diagram of a seismic data acquisition system having a curved profile streamer.
Figure 3:
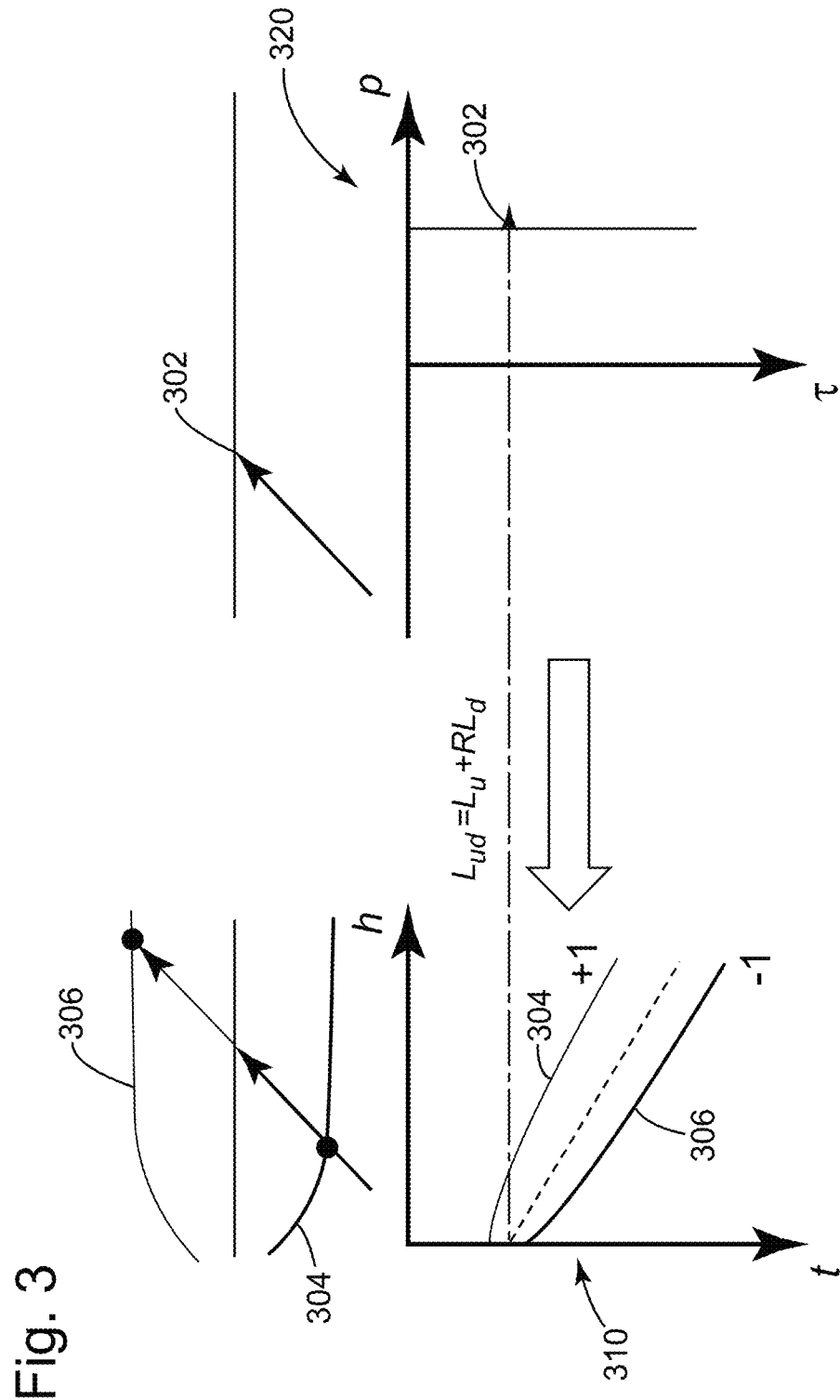
FIG. 3 is a schematic diagram of a transform L from a first domain to a second domain.

When vertical particle velocity data is available, and assuming 2D propagation, the transfer function or operator L (see FIG. 3 and equation (1), i.e., d=Lp) can be extended so that the tau-p model "p" simultaneously satisfies hydrophone and vertical particle velocity data "d" after calibration, i.e., $$\begin{pmatrix} h_1 \\ h_2 \\ h_{N_h} \\ vz_1 \\ vz_2 \\ vz_{N_p} \end{pmatrix} = \begin{pmatrix} e^{-2\pi i f \tau_u} - e^{-2\pi i f \tau_d} \\ \cos\theta_m \left( e^{-2\pi i f \tau_u} + e^{-2\pi i f \tau_d} \right) \end{pmatrix} \begin{pmatrix} p_1 \\ p_2 \\ p_3 \\ p_M \end{pmatrix}, \quad (5)$$

where $\tau_u$ is the time shift for the up-going wave and $\tau_d$ is the time shift for the down-going wave. The time shifts may be defined similar to those of equations (3) and (4) or in a different manner, depending on the model used to describe the wave propagation. The top of the L matrix and the top of the data vector d relate to the $N_h$ hydrophone measurements, and the bottom of the matrix L and the bottom of the data vector d relate to the $N_p$ vertical particle velocity measurements. The term $\cos\theta_m$ in matrix L represents an obliquity factor for a given slowness, e.g., $\sin\theta_m = \pm v_w |s_m|$, where $s_m$ is the slowness for the $m^{th}$ trace (s/m), and $v_w$ is the water velocity between the receivers and sea surface (m/s). The sign should be taken from the sign of $s_m$. The water velocity may be fixed or allowed to vary during the duration of an acquisition. The obliquity factor takes into consideration the inclination $\theta_m$ of each recorded ray relative to a receiver orientation and the receiver orientation may be defined as an angle relative to a vertical axis, e.g., gravity. In other words, the receivers in the streamers can have any orientation due to twisting of the streamer. The raw measurements are then rotated to, for example, a vertical direction and a direction perpendicular to the streamer. Other directions may be used. Therefore, the obliquity term corrects recorded amplitudes based on the difference in the orientation of the recording receiver and a direction of an incoming wavefield. Note that the receiver orientation is different from obliquity. While obliquity is an amplitude term only, the receiver orientation has to do with the orientation of the receivers. In this regard, imagine that the receiver is a single axis accelerometer. Ideally, the receiver's orientation may be aligned with the vertical direction (z axis) or the cross-line direction (y axis) of the nominal shooting direction or zero feather direction (other directions may be preferred; normally two orthogonal directions). However, the streamer experiences twisting and other movements (e.g., feathering) while being towed in water. Thus, the actual orientation of the receiver is most likely neither along the vertical direction nor along the cross-line direction. The raw measurements from the plural receivers may or may not have been rotated in a plane perpendicular to the streamer at the location of the receiver prior to being received for processing. Further complications are introduced when the streamer is slanted or has a curved profile because the vertical orientation of the receivers is not vertical. A method for correctly handling input data that is not ideally aligned with the y and z directions is discussed in the paragraphs related to equations (22) to (28).

It is known that receiver ghost troughs in hydrophone data correspond to peaks on vertical particle velocity receiver data. In the formulation represented by equation (5), a single surface datum tau-p model is derived to satisfy both hydrophone and vertical particle velocity receiver data. As peaks in vertical particle velocity receiver data correspond to troughs in hydrophone data, the dual modelling approach of equation (5) can be more robust than working with either hydrophone or vertical particle velocity measurements in isolation. Once the surface datum tau-p model of up-going energy has been found, it may be used to output up-going or down-going energy at any datum and offset. This result leads to several options for the 2-D case, a selection of which is given below:

1) Output up-going (primary) data at the streamer datum. The up-going may be subsequently subtracted from original pressure data to leave down-going (ghost) energy only.
2) Output down-going data at the streamer datum. The down-going may be subsequently subtracted from original pressure data to leave up-going energy only.
3) Output up-going or down-going data at sea surface datum.
4) Output up-going or down-going data at a new horizontal datum. This allows wavefield separated data to be provided at the start of the processing sequence, so that the data can be processed with conventional algorithms.
5) Output up-going or down-going data at a new variable depth datum.
6) Output up-going and down-going data at a new datum. For example, this can be useful for time-lapse studies.
7) It is also possible to apply deghosting and redatuming in two independent steps. First deghost the data (leaving it at the original depths), then redatum it as a separate operation.
8) Instead of outputting up-going and down-going wave-fields, it is possible to output particle motion data at any x-z location with any orientation. This allows the output of particle motion data on or between the streamers that is substantially free of down-going (ghost) or up-going (primary) energy. The particle motion data may or may not be compensated for obliquity.

The above options can be used to output data at the same offsets as input data, or at new offsets. These are only a set of options, and those skilled in the art could easily imagine other options based on the above-discussed concepts.

One of the above-discussed options has been implemented for exemplary purposes using equation (5) and is illustrated in FIGS. 4A-D. Input hydrophone and input vertical particle velocity data (i.e., recorded data d) is shown in FIGS. 4A and 4B, and the output up-going and down-going wave-fields are shown in FIGS. 4C and 4D. To obtain the output down-going wave-fields (i.e., the ghost), a modified L' transform is applied to model p, where, for example, the modified L' transform may be:

$$L' = \begin{pmatrix} e^{-2\pi i f \tau_u} \\ \cos\theta_m (e^{-2\pi i f \tau_u}) \end{pmatrix}. \quad (6\text{-a})$$

Note that modified L' transform (which in this case is determined by setting the ghost terms to be zero), when applied to model p, generates up-going wave-fields d' in the time-space domain, and this data d' may be subtracted from the original seismic data d to obtain down-going (or surface ghost) wave-fields. If the up-going fields are wanted, the modified L' transform may have the following form:

$$L' = \begin{pmatrix} -e^{-2\pi i f \tau_d} \\ \cos\theta_m (e^{-2\pi i f \tau_d}) \end{pmatrix}, \quad (6\text{-b})$$

to generate down-going energy which may be subtracted from hydrophone data. Due to preferential signal-to-noise levels, wave-field separation is often performed by subtraction of an up-going or a down-going dataset from the pressure recording. In this case, only the hydrophone terms in the above equation would be required. Other forms for the modified L' matrix may be used, depending on the desired output data, e.g., new output positions x' and z' may be selected to reconstruct wave-fields at other positions than the original data. The term "wave-field reconstruction" is understood herein to include not only wavefield separation, but also re-datuming and/or interpolation or any other operation that changes the seismic data's spatial coordinates.

In the hydrophone data in FIG. 4A, up-going primary energy 400 is observed as a positive peak, and down-going ghost 402 is seen as a negative trough (the ghost observes a polarity reversal on reflection at the sea surface). In the vertical particle velocity data in FIG. 4B, up-going primary energy 406 is also positive polarity; while ghost 408 has still experienced a polarity reversal, it is now traveling downward. This "double reverse in polarity" means the ghost energy 408 is now also observed as a peak. Results illustrated in FIGS. 4C and 4D show how up-going wave-field 410 and down-going wave-field 412 have been accurately separated by using one or more L' transforms.

The above example shows wave-field reconstruction using hydrophone and vertical particle velocity data (i.e., the 2D case). However, it is possible to extend matrix L of equation (5) to the 3D case, which may also use, for example, the horizontal particle velocity data, e.g., the particle velocity component perpendicular to the streamers to extend the previous example to wave-field separation and interpolation perpendicular to the streamers. The horizontal particle velocity information perpendicular to the streamer (also called cross-line particle velocity component) helps constrain the $p_y$ direction of model p to go beyond the point of natural aliasing that would be observed with hydrophone-only data. In this case, model p becomes a tau-$p_x$-$p_y$ model which reverse transforms with transform L to simultaneously satisfy hydrophone (h), vertical particle velocity ($v_z$) and horizontal particle velocity perpendicular to the streamers ($v_y$). It is also possible to extend the formulation for $v_x$ measurements (particle velocity along the streamer direction, i.e., inline particle velocity component) if available. In this case, each element in the tau-$p_x$-$p_y$ model vector relates to slownesses in the x (parallel to the streamer) and y (perpendicular to the streamer) directions.

For example, for this case, the primary (up-going) and ghost (down-going) time delays for 3D wave propagation are defined as follows:

$$\tau_u(n, m) = (\underline{h}(n) + \Delta \underline{h}(n,m)) \cdot \underline{s}(m) - \Delta\tau(n,m) \quad (7)$$

$$\tau_d(n,m) = (\underline{h}(n) - \Delta \underline{h}(n,m)) \cdot \underline{s}(m) + \Delta\tau(n,m) \quad (8)$$

where $\underline{h}(n)$, $\Delta\underline{h}(n, m)$ and $\underline{s}(m)$ are now vector quantities relating to offset-x/-y, delta-offset-x/-y, and slowness-x/-y, respectively. The dot product may be evaluated as:

$$(\underline{h}(n)+\Delta\underline{h}(n,m))\cdot\underline{s}(m) = (h_x(n)+\Delta h_x(n))s_x(m) + (h_y(n)+\Delta h_y(n))s_y(m) \quad (9)$$

$$(\underline{h}(n)-\Delta\underline{h}(n,m))\cdot\underline{s}(m) = (h_x(n)-\Delta h_x(n))s_x(m) + (h_y(n)-\Delta h_y(n))s_y(m). \quad (10)$$

The terms in equations (7), (8), (9) and (10) may be defined based on ray geometry relating to FIG. 5A as follows:

$$\sin \underline{\alpha}(m) = v_w \underline{s}(m) \quad (11)$$

$$\Delta \underline{h}(n, m) = z(n) \tan \underline{\alpha}(m) \quad (12)$$

$$\Delta\tau(n, m) = \frac{\sqrt{z^2(n) + |\Delta \underline{h}(n, m)|^2}}{v_w} \quad (13)$$

where $v_w$ is the water velocity, $\underline{\alpha}(m)$ is the vector incidence angle, $z(n)$ is the depth of a given receiver, and $\Delta\tau(n, m)$ is the delta of the time delay. The $\Delta\tau(n, m)$ quantity may be considered as the time between the up-going ray passing through the receiver and reaching the sea surface. This time is the same as the time between the down-going ray leaving the sea surface and reaching the receiver as a ghost. This term is the 3D equivalent of the 2D terms in equations (3) and (4) which is described in more detail in the '776 application.

Figure 5A:
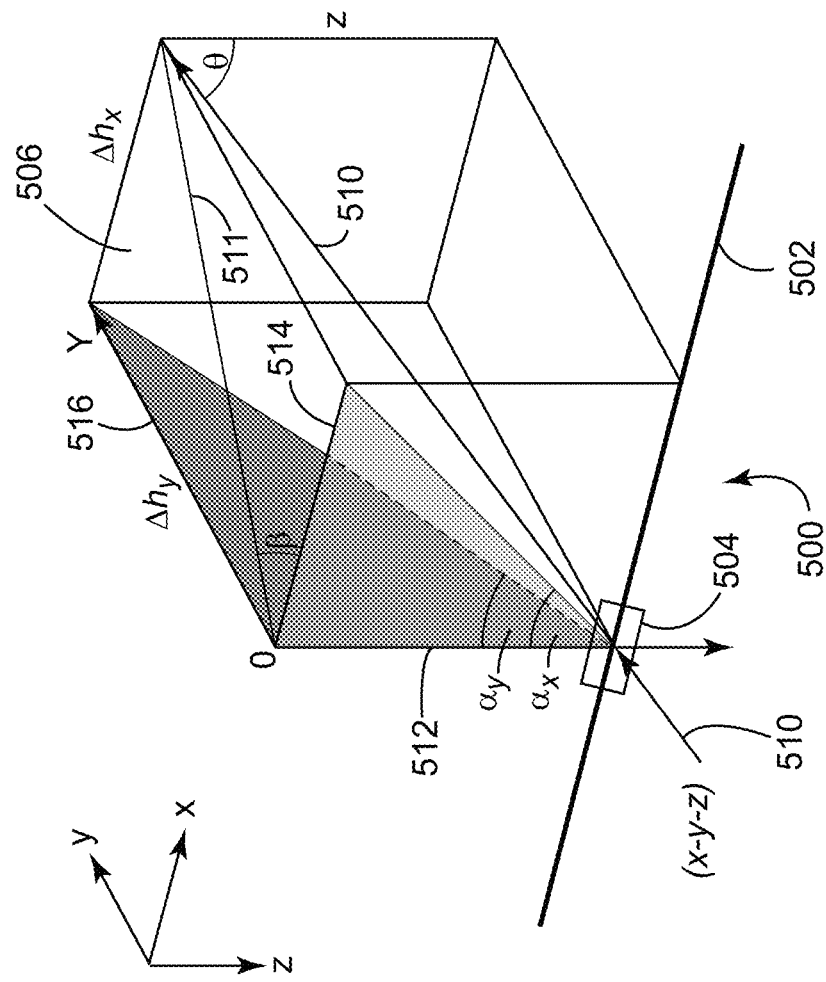
FIG. 5A illustrates an incoming ray and an angle convention associated with it.

Each trace will have its own delay based on the trace's individual offset-x, offset-y and depth (i.e., its coordinates in the space domain). Note that because each trace has its own offset-x, offset-y and depth, the L matrix also depends on the offset-x, offset-y and depth of the traces. Thus, as will be discussed later, an interpolation step may be built in to the L' matrix by selecting new offset-x and offset-y for the output traces. Note that the interpolation step may be performed in-between the streamers, i.e., at any z relative to the z position of the streamers. In other words, the output traces noted above may be output in the same plane as the streamers or above or below this plane. In the interpolation step, it is also possible to output some receivers above and some receivers below the streamers. A re-datuming step may also be built in to the L' matrix in order to output at new receiver depths. In this way, it would be possible to achieve, with the L' matrix, not only wavefield separation and/or interpolation, but also redatuming. Both redatuming and interpolation may be described by the "wave-field reconstruction" term. Thus, in the following, the term wave-field reconstruction includes wavefield separation (e.g., deghosting), interpolation, or redatuming or combination thereof. These capabilities of the L' matrix are discussed later. The new transfer matrix L can be built from elements $l_{u-d}$ and $l_{u+d}$ defined as follows:

$$l_{u-d} = e^{-2\pi i f \tau_u} - e^{-2\pi i f \tau_d} \quad (14)$$

$$l_{u+d} = e^{-2\pi i f \tau_u} + e^{-2\pi i f \tau_d}, \quad (15)$$

where $l_{u-d}$ is used for the hydrophone and horizontal particle velocity terms, and $l_{u+d}$ is used for vertical particle velocity data. By including obliquity terms we may define the 3D vector particle motion as follows:

$$\underline{v}(n, m) = \begin{pmatrix} \sin\theta(m)\cos\beta(m) l_{u-d}(n,m) \\ \sin\theta(m)\sin\beta(m) l_{u-d}(n,m) \\ \cos\theta(m) l_{u+d}(n,m) \end{pmatrix} \quad (16)$$

$$\sin\theta(m) = \pm v_w |\underline{s}(m)| \quad (17)$$

$$\tan\beta(m) = \frac{s_y(m)}{s_x(m)}, \quad (18)$$

where θ is the angle between the ray 510 and the vertical 512 and beta is the angle between the surface projection 511 of the ray 510 (in the up-going surface offset-x/-y 506 and the x-axis 514 as shown in FIG. 5A. The acquisition system 500 illustrated in FIG. 5A includes a streamer 502 and a single receiver 504 for simplicity. Receiver 504 is located at a given depth relative to surface 506, and, as discussed later, it may be any type of receiver, e.g., single or multi-component.

Based on this 3D particle velocity, the matrix L can be adapted for 3D ray propagation as follows:

$$\begin{pmatrix} h_1 \\ h_2 \\ h_N \\ vz_1 \\ vz_2 \\ vz_N \\ vy_1 \\ vy_2 \\ vy_N \end{pmatrix} = \begin{pmatrix} l_{u-d} \\ \cos\theta(m) l_{u+d}(n, m) \\ \sin\theta(m)\sin\beta(m) l_{u-d}(n, m) \end{pmatrix} \begin{pmatrix} p_1 \\ p_2 \\ p_3 \\ p_M \end{pmatrix}. \quad (19)$$

Figure 5B:
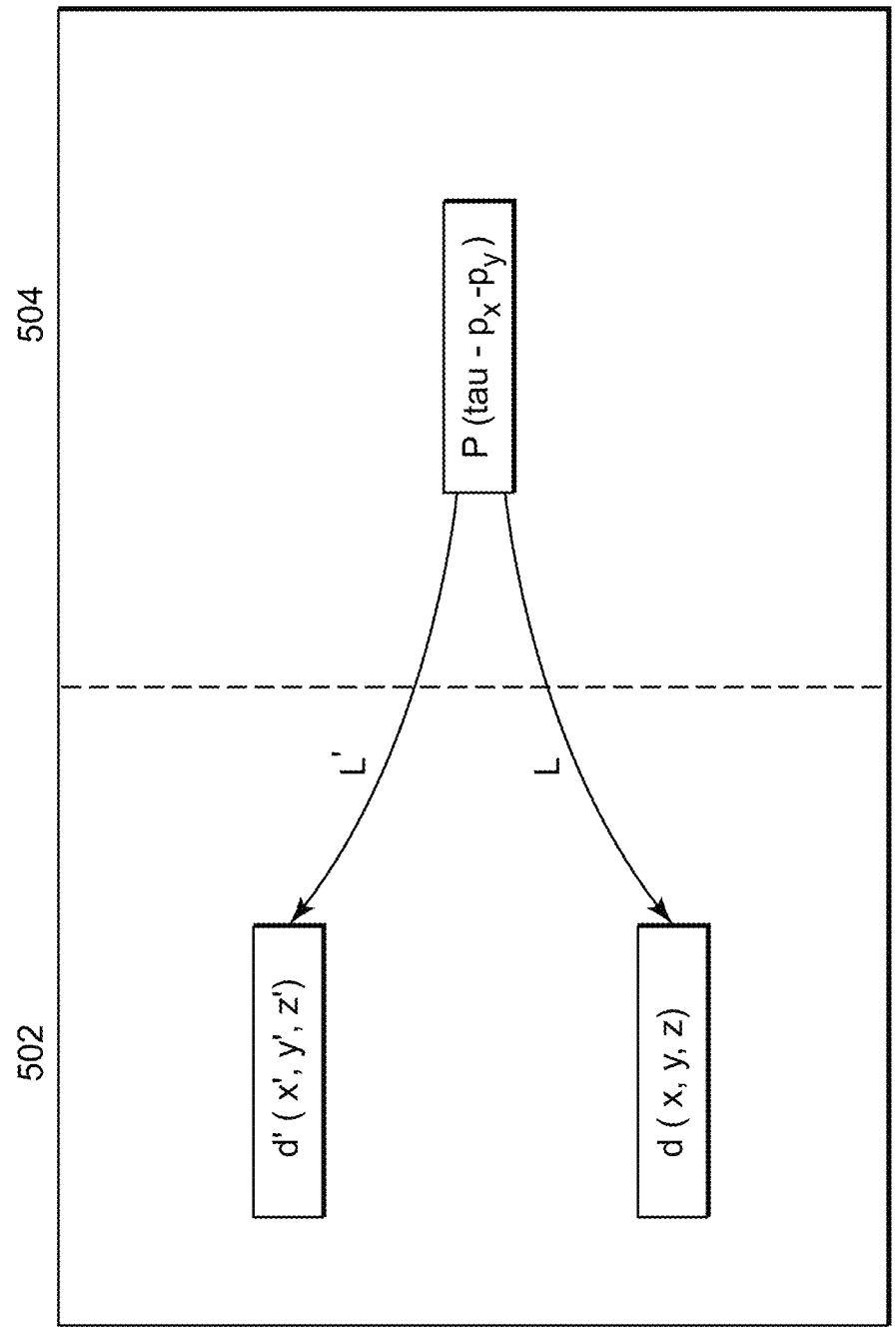
FIG. 5B schematically illustrates a processing method for obtaining deghosted and reconstructed data.

The top third of the L matrix and the top third of column vector data d in equation (19) relate to hydrophone measurements, the middle third of L and d relates to vertical particle velocity receiver data ($V_{zi}$), and the bottom third relates to horizontal particle velocity data ($V_{yi}$) perpendicular to the streamers. While this example uses the same number of hydrophone, $v_z$, and $v_y$ components, other examples may have a different number of measurements for each component. Thus, the expressions "top third," "middle third," and "bottom third" used herein should be understood in a liberal way, i.e., to include more or less than one third of the elements of the matrix or column vector data. Multi-component measurements may just be available for a limited range of offsets (e.g., near offsets) and hydrophone only measurements thereafter. Some streamers may contain multi-component receivers, other streamers may be contain hydrophone only receivers. As before, model p is found to simultaneously satisfy hydrophone and particle velocity data, i.e., as illustrated in FIG. 5B, when transform L is applied to model p, original seismic data d is obtained. In the case that hydrophone and particle velocity data have different bandwidths, a frequency dependent filter may be built into the equation as follows:

$$\begin{pmatrix} h_1 \\ h_2 \\ h_N \\ vz_1 \\ vz_2 \\ vz_N \\ vy_1 \\ vy_2 \\ vy_N \end{pmatrix} = \begin{pmatrix} l_{u-d}(n,m) \\ F_v \cos\theta(m) l_{u+d}(n,m) \\ F_v \sin\theta(m) \sin\beta(m) l_{u-d}(n,m) \end{pmatrix} \begin{pmatrix} p_1 \\ p_2 \\ p_3 \\ p_M \end{pmatrix}. \quad (20)$$

This allows the derivation of a single model, p, which satisfies hydrophone data at all frequencies but is required to only satisfy particle velocity data in a restricted frequency range, e.g., for higher frequencies, e.g., above 30 Hz. While equation (20) uses a constant $F_v$, in other examples this quantity may be permitted to vary for each frequency and also from trace to trace depending on noise characteristic variations. In one application, different quantities may be used for the $v_z$ and $v_y$ components.

However, as also illustrated in FIG. 5B, after model p is found, another transform L' may be applied to model p to obtain primary only, or ghost only or another combination of data d' as already discussed above. New data d' may be at the same datum as the original data, i.e., z=z', or at the same exact positions, i.e., x=x', y=y' and z=z', or it may be interpolated, i.e., x or y or both may be different from x' and y', or it may be reconstructed at completely another position, i.e., x, y and z are different from x', y' and z', respectively. New transform L' may contain up-going and down-going terms or also include other operations, i.e., deghosting, etc. In this document, the terms up-going and primary are used interchangeably. The same is true for terms down-going and ghost.

Figures 6A, 6B, 6C, 6D:
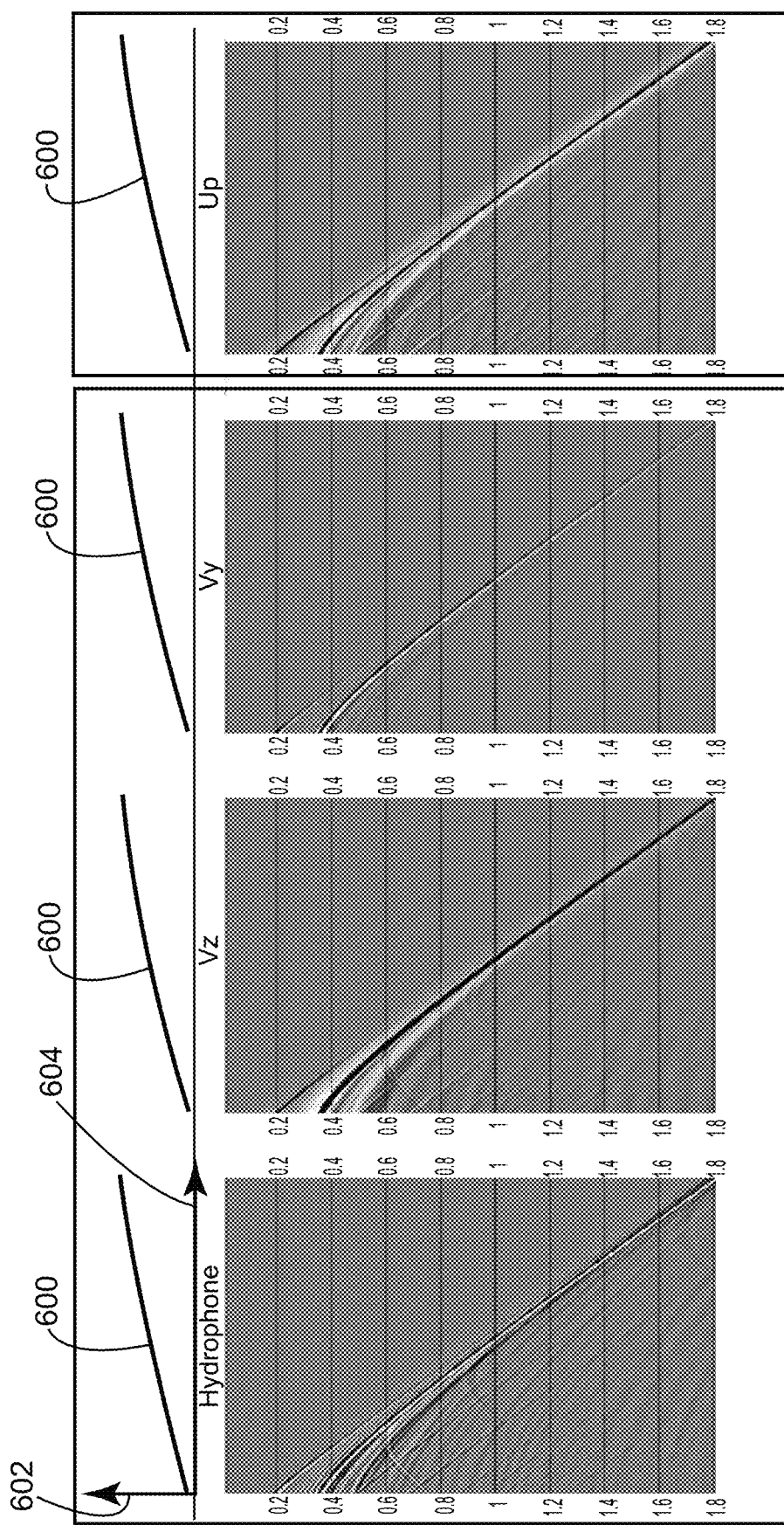
FIGS. 6A-C illustrate input multicomponent data and FIG. 6D illustrates output deghosted data.

A synthetic dataset has been generated with pressure and particle motion (velocity) components as illustrated in FIGS. 6A-C. The dataset consisted of 8 streamers with 75 m separation each and 12.5 m channel spacing. Other numbers may be used. FIGS. 6A-C show input data, and FIG. 6D shows data output with up-going energy only. Lines 600 in FIGS. 4A-D show the streamer's depth variation (along axis 602) with source-receiver offset (along axis 604). The presence of energy on the $v_y$ component (FIG. 6C) indicates a cross-line component to the particle motion. By including this or other components in the equation, better 3D deghosting may be achieved.

Figures 7A, 7B, 7C, 7D:
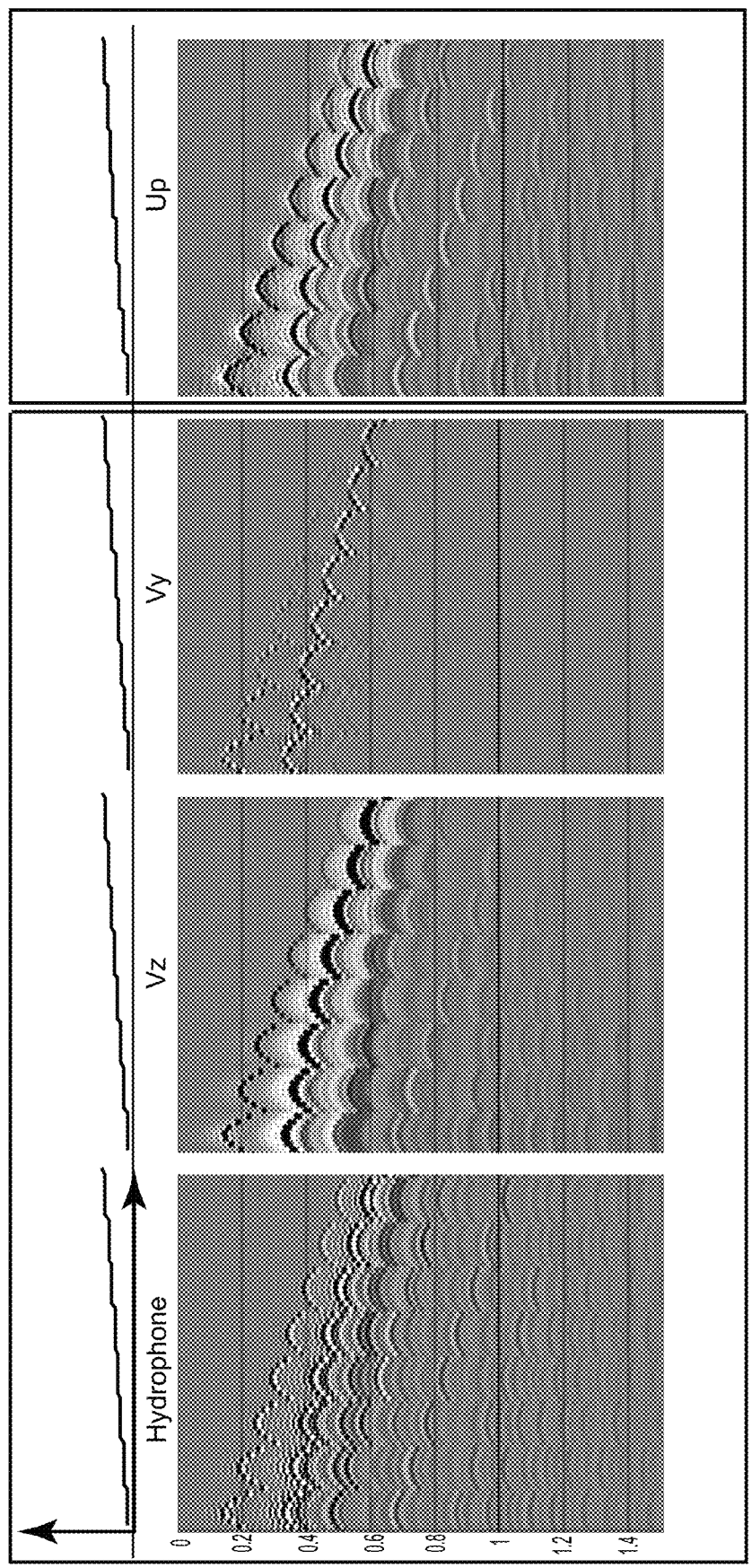
FIGS. 7A-C illustrate input multicomponent data.
FIG. 7D illustrates output deghosted data, FIG. 7E illustrate various channels and FIG. 7F illustrate a change in polarity.
Figure 7E:
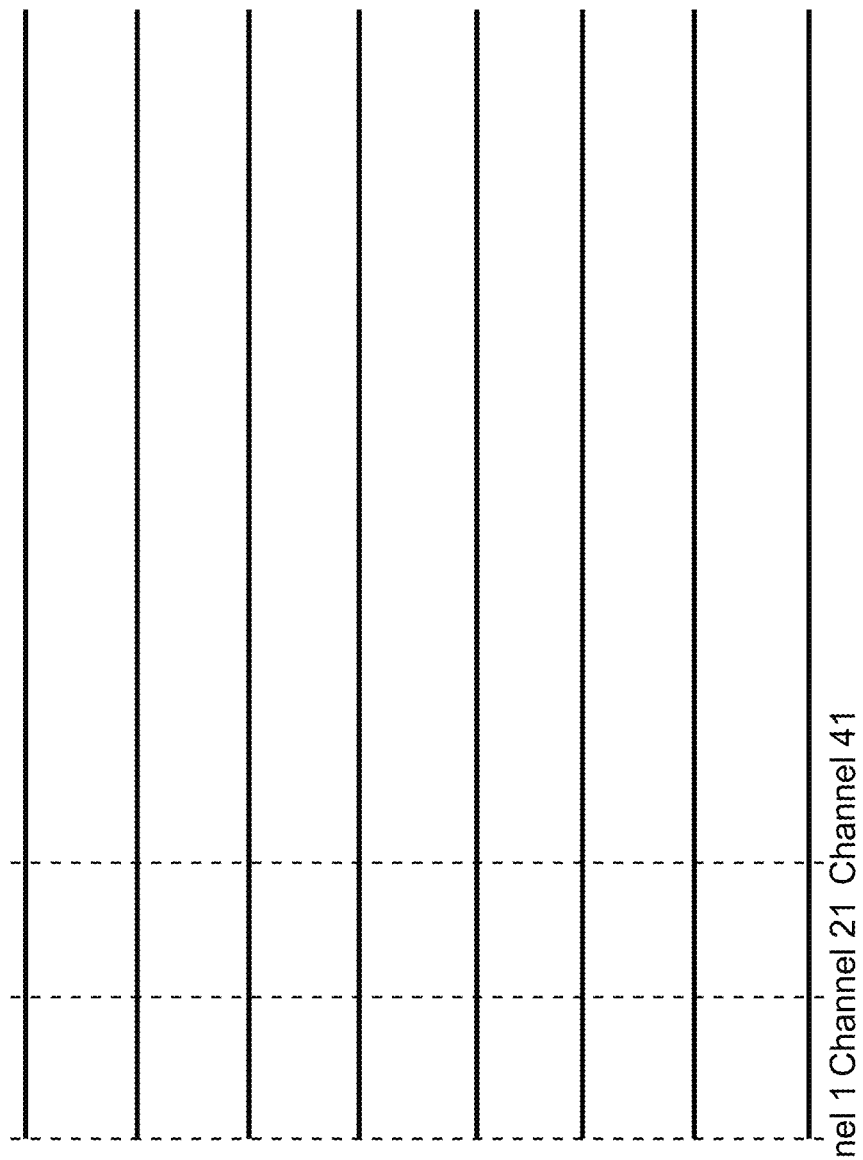

The $v_y$ component is also useful for interpolation. In particular, properties of the $v_y$ component are beneficial for reducing aliasing. FIGS. 7A-C show input synthetic data, and FIG. 7D shows results for common channel panels (streamers 1 to 8 for channel 1, followed by streamers 1 to 8 for channel 21, etc. as illustrated in FIG. 7E) when equation (19) is used.

Figure 7F:
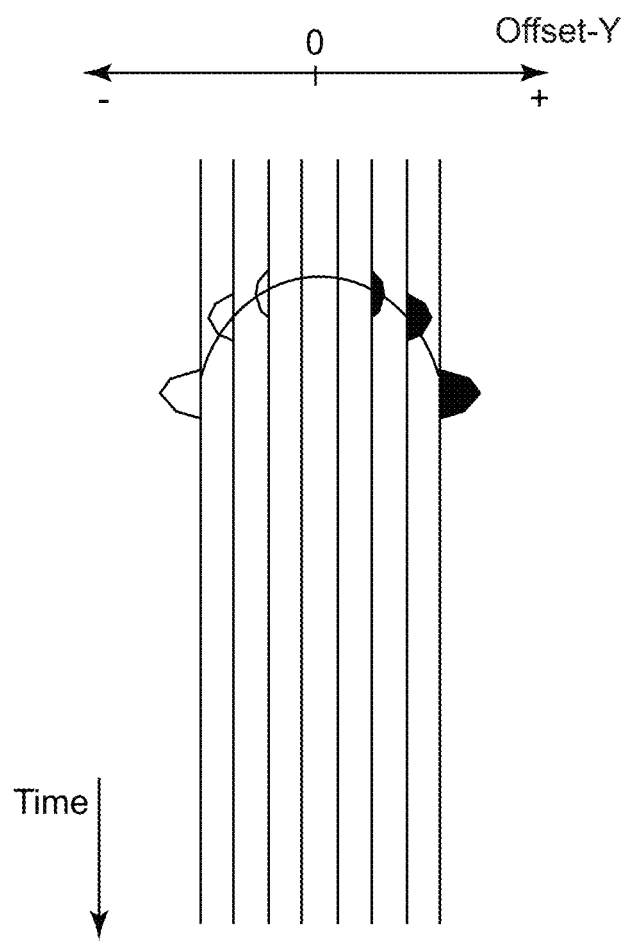

It may be seen in FIG. 7F that the polarity of the $v_y$ component changes for positive and negative y-offsets (X axis in the figure), as expected. The input data in FIGS. 7A-C is displayed at 75 m spacing, but the output up-going dataset in FIG. 7D has been output with 37.5 m streamer spacing. This can be seen from the finer trace spacing on the output. Even though the input data is observed to be aliased, the output is nicely reconstructed.

Thus, according to an embodiment, there is a method for processing input seismic data d that includes a step of receiving input seismic data d recorded in a first domain by seismic receivers that travel in water, with input seismic data d including primary and surface ghost wave-fields; a step of generating a model p in a second domain to describe input seismic data d; and a step of processing model p to obtain a seismic dataset indicative of ghost wave-fields and substantially free of primary wave-fields.

Input seismic data d includes only pressure measurements, or only particle motion measurements, or both pressure and particle motion measurements. The first domain may be a time-space domain, while the second domain may be one of a Radon domain (hyperbolic, parabolic, etc), frequency-wave number domain, tau-p domain, rank reduction, singular value decomposition (SVD), and curvelet domain. In one application, the step of generating a model p includes solving an inverse problem based on linear operator L and the input seismic data d, and applying an L' transform to the model p to obtain a seismic dataset indicative of ghost wave-fields, with the L' transform combining primary attenuation and interpolation. The L' transform may be applied after a denoising step is applied to model p. In one application, an amount of noise is reduced by controlling sparseness weights when the model domain is derived. The sparseness weights may also be derived to mitigate aliasing, which may be especially useful if only hydrophone or only particle velocity data is input. The sparseness weights may be derived initially at low frequencies (e.g., at values less than 10 Hz) and used to constrain the model at high frequencies. The sparseness weights may be updated during several iterations, e.g., 0-10 Hz model is used to constrain a 0-20 Hz model which is used to constrain a 0-40 Hz model, etc. The sparseness weights may be derived from the envelope of the tau-p model at each iteration. Processing in the model domain may also include muting, scaling, resampling, removing cross-talk or interference noise, re-datuming and vector rotation, as will be discussed later.

The seismic dataset indicative of ghost wave-fields may be generated at positions in-between the receivers, i.e., having any output z relative to the zs of the receivers and/or streamers. The positions may be at a different datum than the receivers, or the positions are designed to match positions of receivers from another seismic survey, or the positions are equidistant from input streamers on which the receivers are distributed, or the positions are on a regular grid.

In one application, the seismic dataset indicative of ghost wave-fields may be subtracted from input seismic data d to obtain data d' to be used to generate a final image of a surveyed subsurface, or the seismic dataset indicative of ghost wave-fields is directly used to generate a final image of a surveyed subsurface.

According to another embodiment, there is a method for processing input seismic data d. The method includes a step of receiving input seismic data d recorded, in a first domain, by seismic receivers that travel in water, with the input seismic data d including pressure and particle motion measurements; a step of generating a model p in a second domain to describe input seismic data d; and a step of processing model p to output a seismic dataset with attenuated noise. The step of processing may include removing cross-talk noise in model p by muting, wherein cross-talk noise is generated when two or more seismic sources generate seismic waves at the same time. The method may also include further removing cross-talk noise based on the non-coherent nature of model p in the second domain. An amount of noise may be reduced by controlling sparseness weights when an L transform is applied. In one application, the second domain is a common channel domain, and the first domain is a time-space domain. In another application, the second domain is one of a radon domain, frequency-wave number domain, rank reduction, SVD, tau-p domain, and curvelet domain. For example, the data in the second domain may be sorted into the common-p/shot domain in which the timing of the noise may vary. Erratic/impulsive denoise methods may be used to mitigate the noise based on the inconsistent timing of the noise.

The step of generating a model p may include solving a linear problem based on input data and an operator L, followed by an L' transform to obtain seismic dataset with attenuated noise, wherein the L' transform combines deghosting and interpolation. The L' transform may also include resampling, and/or redatuming and/or vector rotation. In one application, the seismic dataset with attenuated noise is used to generate a final image of a surveyed subsurface.

Figure 8:
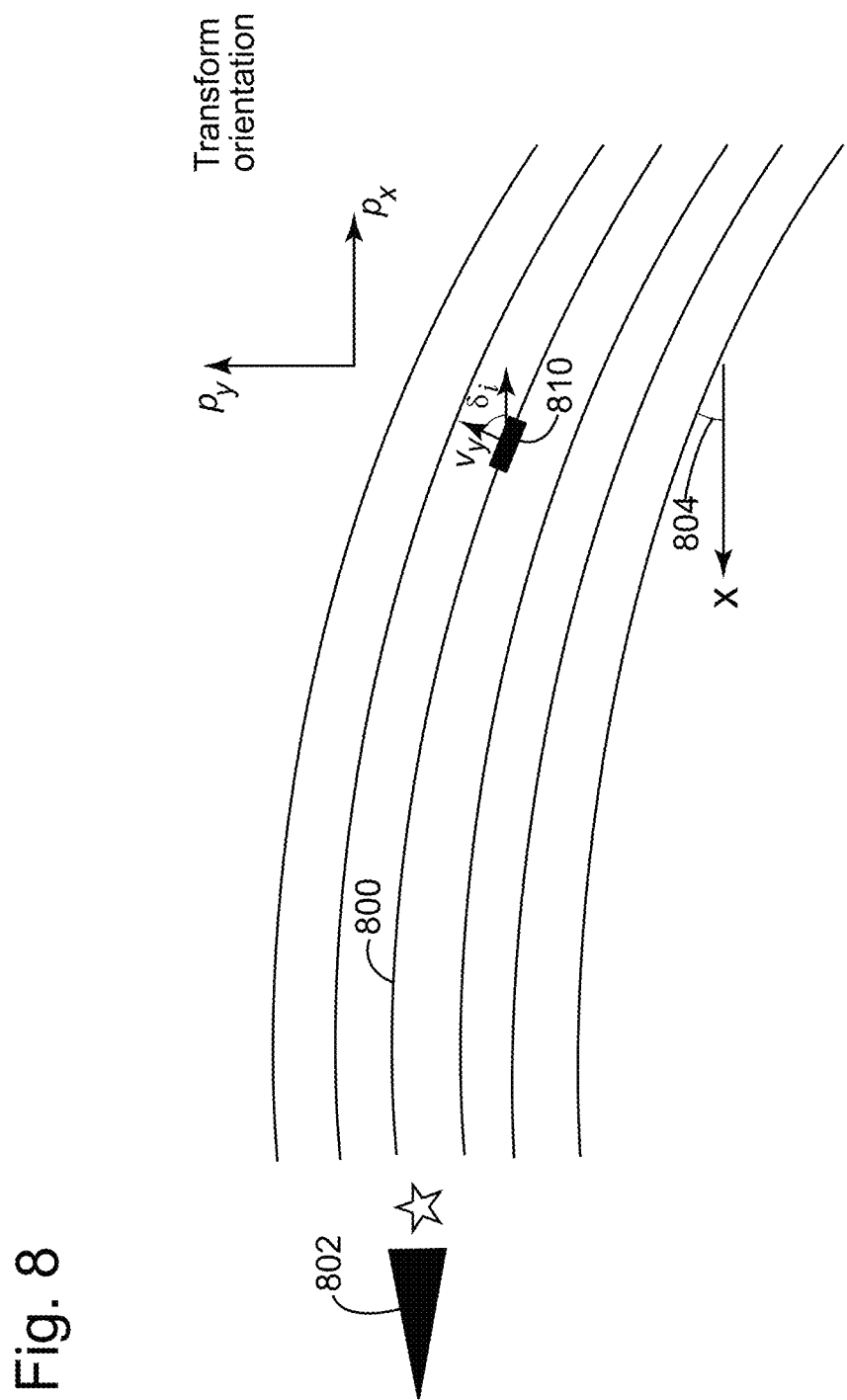
FIG. 8 illustrates how a seismic receiver's position changes along a streamer.

The above-discussed embodiments did not take into account the orientation of the receivers, which may change as the streamers are towed in water. In other words, the receivers were assumed to be oriented parallel to the shooting direction, i.e., extending along the inline direction. However, often this is not the case because streamer 800, when towed by vessel 802, may make a feather angle 804 with traveling direction X (i.e., inline direction), as illustrated in FIG. 8 and, thus, a receiver may be oriented in various ways relative to the streamers.

To account for this, it may be necessary to modify the obliquity terms relating to the $v_y$ component on a trace-by-trace basis, based on the orientation of each receiver. In the following formulation, angle $\delta(n)$ represents the orientation of the streamer to the transform orientation (px-py) at the location of a given receiver 810 (which, for simplicity's sake here, is defined as the nominal shooting direction). This is equivalent to the angle between the orientation of the $v_y$ receiver and the model $p_y$ direction. Thus, the modified form of the L matrix that takes receiver orientation into account is given by:

$$\begin{pmatrix} h_1 \\ h_2 \\ h_N \\ vz_1 \\ vz_2 \\ vz_N \\ vy_1 \\ vy_2 \\ vy_N \end{pmatrix} = \begin{pmatrix} l_{u-d}(n,m) \\ \cos\theta(m) l_{u+d}(n,m) \\ \sin\theta(m)\sin(\beta(m)+\delta(n)) l_{u-d}(n,m) \end{pmatrix} \begin{pmatrix} p_1 \\ p_2 \\ p_3 \\ p_M \end{pmatrix}. \quad (21)$$

While this embodiment is discussed in the context of particle velocity measurements in directions vertical and perpendicular (i.e., along a cross-line direction) to the streamer, the equations can be modified for particle velocity receivers oriented in any direction. For example, due to a streamer twisting while towed in water, accelerometers along the streamer may be oriented in any direction. In addition, with a variable-depth streamer, it may be important to accurately model the orientation of the "vertical component" which may not be strictly vertical, but rather perpendicular to the streamer.

Although the data may be preprocessed to reorient the recordings to a vertical and streamer-perpendicular orientation, it is possible to leave the data at the original orientation and design L matrix elements based on the orientation of each individual receiver. While the discussion here relates to a hydrophone plus two other components, it is possible to modify the equations to any number of particle velocity measurements oriented in any direction. The orientation of each receiver can be different.

According to an embodiment, a method for processing input seismic data d includes a step of receiving the input seismic data d recorded, in a first domain, by seismic receivers that travel in water, with the input seismic data d including pressure and particle motion measurements; a step of generating a model p in a second domain to describe the input seismic data d, with model p taking into account an obliquity of incoming wave-fields; and a step of processing model p to output a particle motion dataset corrected for obliquity. The method may include wave-field reconstruction of incoming wave-fields based on pressure and particle motion measurements and model p.

In one application, incoming wave-fields are reconstructed at new receiver positions. The particle motion dataset corrected for obliquity includes surface ghost wave-fields, or is substantially free of surface ghost wave-fields. In one embodiment, the first domain is time-offset/x-offset/y-depth and the second domain is tau-slowness/x-slowness/y, where offset/x is a distance between a source generating input seismic data d and a corresponding receiver along an inline direction, and offset/y is a distance between the source and corresponding receiver along a cross-line direction, which is substantially perpendicular on the inline direction.

In one application, the output particle motion dataset corrected for obliquity is not interpolated. In another application, a component of the particle motion dataset corrected for obliquity is summed with pressure data in the first domain to obtain wave-field separation. Similar to other methods discussed herein, an L' transform may be applied to obtain the particle motion dataset corrected for obliquity, wherein the L' transform combines the obliquity and wave-field reconstruction. The L' transform may include other operations as already discussed.

According to another embodiment, there is a method for processing input seismic data d that includes receiving the input seismic data d recorded, in a first domain, by seismic receivers that travel in water, with input seismic data d including pressure and particle motion measurements; generating a model p in a second domain to describe input seismic data d; and processing model p to output a seismic dataset with attenuated noise. The processing step may include removing cross-talk noise in model p by muting, wherein cross-talk noise is generated when two or more seismic sources generate seismic waves at the same time.

According to still another embodiment, it is possible to derive a single fixed datum model which, when reverse-transformed, simultaneously models all available particle velocity and hydrophone measurements (in this case hydrophone, vertical $v_z$ particle velocity receiver, and $v_y$ horizontal particle velocity receiver perpendicular to the streamers; inline $v_x$ may be added) at the recording depths and offset-x/offset-y positions.

Once the tau-px-py model has been found (no matter which formulation or which components have been used), it can be used to output up-going data, down-going data, or a combination of the two at any spatial position, where the term "spatial position" means x (inline position), y (cross-line position), and z (receiver depth) coordinates. Note that the term "output" includes one or more of wavefield regularization, interpolation, deghosting, denoising, redatuming, resampling, etc. Each individual output trace can have its own x, y, z location (e.g., general floating datum). This location may be at the position of the original receivers, in between the original receivers, for example, interpolation at a new streamer location, at any receiver depth, or a combination of in between the streamers at different depths. This method can be used to output up-going energy at the surface or other horizontal datum, which may be subsequently processed with conventional processing algorithms. The method can also be used to output down-going energy at the surface or any other datum, and again, this may be processed with conventional algorithms.

The interpolation aspect of this method can be used to de-alias the cross-line sampling of a dataset, or to map on to the exact receiver x-y-z coordinates of another dataset, towed streamer, OBS, or land dataset. The data may be output for up-going, down-going or a combination of the two. The output positions of all traces can be at any x-y-z coordinate within the original streamer spread or outside the spread (extrapolation). Up-going and down-going datasets may be output at different datums if required.

In another embodiment, the L matrix discussed above may be used for time-lapse studies where one or more vintage datasets consist of measurements at different spatial coordinates and/or receiver depths than new acquisition measurements. Once the model p has been found, it may be used to output data at the exact x-y coordinates and depths of any prior vintage (baseline) dataset or other positions. This allows accurate comparison of vintage datasets and reconstructed monitor datasets. Up-going, down-going or a combination of both may be used for this purpose. For example, a base hydrophone-only dataset will contain primary and ghost data, and interpolation or deghosting of this base dataset may not be possible. In this case, it can be of interest to output the monitor data (the later-in-time survey data) at the x-y-z recording coordinates of the baseline, including primary and ghost. With multiple datasets, it may be of interest to interpolate all vintages on to a common sampling that includes positions not occupied by any dataset. The positions could be designed so that the interpolation distance on average is minimum, i.e., the positions are selected as close as possible to the input data positions because the interpolation quality at positions further away is expected to degrade.

According to another embodiment, different x/y offsets and depths may be used for up-going and down-going datasets, for example, to improve illumination or to match wave-field propagation to a vintage dataset or datasets.

The scheme may be used to output particle velocity data onto a second set of traces to help interpolation, e.g., if a first base dataset includes only hydrophone data and a monitor dataset includes multi-component data, it is possible to interpolate the monitor dataset to the positions of the base and then use the base hydrophone combined with interpolated monitor particle velocity for interpolation of the base hydrophone data. One example is the use of a monitor hydrophone/particle motion dataset for outputting particle velocity measurements on a vintage dataset. Interpolated particle velocity measurements combined with original pressure measurements from the vintage data can be used for interpolation of the vintage dataset. Alternatively, particle motion data may be extrapolated within a shot gather from near offsets (where accelerometer measurements are available) to far offsets (where accelerometers were not installed).

The methods discussed in the previous embodiments can be generalized to a method that derives a fixed datum model to satisfy any number of particle velocity data with any 3D orientation, along with a different number of hydrophone measurements. Measurements of hydrophone and particle motion need not be co-located in space or depth. Individual particle motion receivers need not be consistently oriented.

In this regard, consider N hydrophone measurements and O particle velocity measurements. Hydrophone and particle velocity measurements each have their unique coordinates (x, y, and z (depth)). First, refer to equations (16) to (18) describing the particle velocity vector based on a known model:

$$\underline{v}(n,m) = \begin{pmatrix} \sin\theta(m)\cos\beta(m)l_{u-d}(n,m) \\ \sin\theta(m)\sin\beta(m)l_{u-d}(n,m) \\ \cos\theta(m)l_{u+d}(n,m) \end{pmatrix} \quad (22)$$

using the angle definitions introduced in FIG. 5A.

The three particle velocity components can then be re-oriented to the orientation of each individual receiver. Receiver orientation may vary from shot to shot, and even during the recording time of a trace. One way to re-orient the receiver is to take the resolved component of the wave-field vector through use of the dot product. This possibility is now discussed in more detail. However, other ways may be imagined by those skilled in the art.

If $\underline{v}_a$ is a vector having components ($v_x$, $v_y$, $v_z$) representing the three particle motion components for a given receiver, and unit vector $\underline{\alpha}$ ($|\alpha|=1$) represents the receiver orientation relative to the transform orientation ($p_x$, $p_y$ as in FIG. 8), the following may describe the resolved component of the wave-field along the receiver orientation:

$$\underline{\alpha}\cdot\underline{v} = |\alpha||v|\cos\sigma. \quad (23)$$

The following notation may be introduced:

$$r = |v|\cos\sigma \quad (24)$$

in which case r may be rewritten as:

$$\cos\sigma = \frac{r}{|\underline{v}|} = \frac{\underline{a}\cdot\underline{v}}{|\underline{a}||\underline{v}|} \quad (25)$$

$$r = \frac{\underline{a}\cdot\underline{v}}{|\underline{a}|} \quad (26)$$

$$r = \frac{a_x v_x + a_y v_y + a_z v_z}{|\underline{a}|} = a_x v_x + a_y v_y + a_z v_z, \quad (27)$$

where σ is the angle between wave-field vector v and receiver orientation a. Wave-field vectors v vary with $p_x$ and $p_y$, and the receiver orientation a varies with the shot and time for each receiver. As noted above, other re-orientation schemes can be used.

Based on equation (27), the final matrix formulation may be given by:

$$\begin{pmatrix} h_1 \\ h_2 \\ h_N \\ v_1 \\ v_2 \\ v_3 \\ v_4 \\ v_5 \\ v_o \end{pmatrix} = \begin{pmatrix} l_a \\ r_1 \\ r_2 \\ r_o \end{pmatrix} \begin{pmatrix} p_1 \\ p_2 \\ p_3 \\ p_M \end{pmatrix} \quad (28)$$

where the top part of the L matrix and the top part of data vector d (receivers 1 to N) relate to hydrophone measurements, and the following rows for L matrix and data vector d relate to particle velocity data (receivers 1 to O). Model vector p contains M values. In one embodiment, M values include slownesses in the x and y directions, although other model domains may be used as discussed later.

The transform L from the coordinate system of model p to the receivers' coordinate system (e.g., time-space domain) may vary for each receiver and with time. This means the orientation of the receivers can vary from shot to shot, but also during recording of an individual trace. The L' transform may be designed or coded based on equation (27), for each receiver, to rotate the particle motion receivers (i.e., their recording) to be aligned with the y-axis, z axis, or any preferred axis. This step of vector rotation may be applied to any of the embodiments discussed herein. In this way, the input particle motion measurements may be received with arbitrary orientation, being allowed to vary for each receiver and are not substantially orientated in two or fewer directions. Output particle motion measurements may be formed such that they may also take any arbitrary orientation. The orientation of the output particle motion receivers may be the same as the input particle motion receivers or may be different to the input particle motion receivers. The term receiver orientation should relate to the orientation of the streamer data received by the processing algorithm. This orientation may be different to the orientation of the original receiver if the data has previously being re-orientated. Several individual receivers may be summed to form a receiver group. The receiver data input to the algorithm may relate to individual receivers or receiver groups. In other words, there is a method for processing input seismic data d that includes a step of receiving the input seismic data d recorded in a first domain by seismic receivers that travel in water, the input seismic data d including pressure and particle motion measurements, a step of generating a model p in a second domain to describe the input seismic data d, and a step of processing the model p to obtain an output seismic dataset, the output seismic dataset including wave-field reconstruction of the pressure wave-fields and/or particle motion wave-fields based on the model p. The particle motion measurement's orientations may vary from receiver to receiver. In one application, the particle motion measurement's orientations vary between groups of receivers. In another application, part of all the orientations are not along predetermined directions, e.g., y and z directions.

The above-discussed transforms may be adapted to work under different conditions. For example, through reciprocity, any of the above methods can be modified to work in the common receiver domain where there is a sufficient sampling of shots. This can be of use for land or OBS datasets where there is a need to redatum, deghost, reghost, etc.

The 3D algorithms introduced above may be used for many things, some examples are given below:

1) Output up-going (primary) data at the streamer datum. The primary may be subsequently subtracted from original pressure data to leave down-going energy only.
2) Output down-going (ghost) data at the streamer datum. The ghost may be subsequently subtracted from original pressure data to leave up-going energy only.
3) Output up-going or down-going data at surface datum.
4) Output up-going or down-going data at a new horizontal datum. This allows deghosted data to be provided at the start of the processing sequence, so that the data can be processed with conventional algorithms.
5) Output up-going or down-going data at a new variable depth datum.
6) Output up-going and down-going data at a new datum. For example, this can be useful for time-lapse studies.
7) It is also possible to apply deghosting and redatuming in two independent steps. First deghost the data (leaving it at the original depths), then redatum it as a separate operation.
8) Instead of outputting up-going and down-going wave-fields, it is possible to output particle motion data at any x-y-z location with any orientation. This allows the output of particle motion data on or between the streamers that is substantially free of down-going (ghost) or up-going (primary) energy. The output particle motion data at or between the streamers may or may not be corrected for obliquity. This data may be processed in parallel with pressure data and combined post-migration with a joint deconvolution-type deghosting approach. Alternatively, it may be summed with pressure data to achieve wavefield separation.
9) In addition, particularly with the use of sparse inversion, this procedure can be used for joint interpolation, deghost and denoise.
10) The tau-$p_x$-$p_y$ model can be used to separate cross-talk noise (with simultaneous shooting) or interference noise based on model parameter ranges.
   a. In simultaneous shooting, the wave-field from two sources is recorded;
   b. Where the sources are at different spatial positions, there may be a difference in the angle at which the wave-field approaches the receivers;
   c. When this is the case, the wave-fields may be denoised by muting the noise in the tau-px-py domain. If the separation is not perfect, the noise may be further separated based on the non-coherent nature of the data in a given domain, for example, the common p/shot domain;
   d. Subsequently, a reverse tau-px-py transform may be used to separate energy from the different sources in combination with any other items listed here, or to come back to the original coordinates.
11) It is possible to make use of the model domain p for demultiple purposes, after which data (any combination of the above) may be output on the input sampling or elsewhere, with or without free surface ghost. One example is the application of multiple attenuation using tau-px-py deconvolution in the model space. In the tau-px-py domain (model domain p) the multiples may be identified based on velocity discrimination and/or periodicity. Multiples are periodic in model domain p. Thus, recorded data d may be transformed to the model, autocorrelation functions may be calculated for each trace, a lag is determined based on autocorrelations for, e.g., predictive deconvolution, the deconvolution is applied to select the multiples, and the multiples are then transformed back to the time-space model where they are removed from original data d. Normally, sampling restrictions mean that tau-p deconvolution is applied in 2D in either shot or receiver domain (or both). The results may be sub-optimal due to the data exhibiting 3D wave field propagation in reality. The use of particle motion measurements to make a 3D (tau-$p_x$-$p_y$) model p can thus lead to improved demultiple.
12) Any combination of the above-noted embodiments or parts of them may also be envisioned by one skilled in the art.

The above options can be used to output data at the same offsets as input data, or at new offsets. These are only a set of options, and those skilled in the art could easily imagine other options based on the above-discussed concepts.

It can be also possible to extend the above methods to work on shot and receiver deghosting and redatuming simultaneously. This could be considered as an algorithm with 7D input; i.e., source at positions S(x, y, z) and receivers at positions R(x, y, z). Receivers can include a mixture of hydrophones and particle motions sensors (as will be described later), with each particle motion sensor having its own orientation $a_0(x, y, z)$ as before. This arrangement could lead to a 5D surface consistent model tau-$p_{sx}$-$p_{sy}$-$p_{rx}$-$p_{ry}$, where $p_{sx}$ and $p_{sy}$ are source slownesses in the x and y directions, and $p_{rx}$ and $p_{ry}$ are receiver slownesses in the x and y directions. Where sufficient sampling of the source is not available, it would be possible to reduce the number of dimensions to S(x, z) and R(x, y, z), where the sources are positioned along a 2D line. Sparseness constraints can be used to help with interpolation beyond aliasing. In addition, sparseness can be used to denoise. Further, this algorithm or any of the methods discussed herein may be combined with source interpolation for obtaining wavefield reconstruction on the receiver side.

In addition, source directivity compensation may be added in to the above formulation by including a resignature operation as a function of source takeoff slowness. The resignature operation may include source airgun array effects as well as the source ghost. Assumptions relating to source and receiver takeoff slownesses may be made based on ray tracing, which may be in 1D (e.g., normal moveout (NMO)) and use a complex velocity model.

Input data for any of the above methods may be in any pre-stack domain, for example shot, receiver, midpoint, conversion point or cross-spread. The intention is that any of the above implementations would be made on a computer. While much of the previous embodiments discussed use multi-component measurements, it should be noted that where signal-to-noise ratio and sampling allows, the scheme(s) may be used with fewer data, e.g., hydrophone data only or particle motion data only. In particular, this may require more demands on sparseness constraints, e.g., beginning by solving the equations for a low frequency bandwidth which is not aliased, and using the model to derive sparseness weights for the higher frequency model solution. Also, it may be possible to use as input pressure and particle motion data and to generate an output that includes only pressure wave-fields or only particle motion wave-fields, as now discussed.

One embodiment may include using hydrophone only data to construct an estimate of particle motion data. The estimate of particle motion data may or may not be corrected for obliquity. The estimate of particle motion data may or may not include wavefield separation. The estimate of particle motion data may be subtracted from recorded particle motion data to leave a residual. This residual particle motion data may then be denoised following which the estimated particle motion data is added to the resulting denoised data.

For example, in one embodiment there is a method for processing input seismic data d that includes a step of receiving input seismic data d recorded in a first domain by seismic receivers that travel in water, with the input seismic data d including pressure and particle motion measurements representative of primary and surface ghost wave-fields; a step of generating a model p in a second domain to describe input seismic data d, wherein there is a mathematical transform L which, when applied to model p, results in input seismic data d; and a step of processing with a mathematical transform L' the model p to obtain, in the first domain, a seismic dataset indicative of pressure wave-fields and having a characteristic imparted by transform L', wherein mathematical transform L' is different from mathematical transform L.

The L' transform may be obtained in various ways, for example, by selecting one or more parameters in the L transform to be zero. In one application, the L' transform has more terms than the L transform. The characteristic is related to the pressure wave-fields being interpolated among receiver positions and being free of primary wave-fields, or to the pressure wave-fields being deghosted and interpolated among receiver positions, or to the pressure wave-fields being interpolated among receiver positions based on rotated particle motion measurements, or to the pressure wave-fields being interpolated along streamers including the seismic receivers, or to the pressure wave-fields being calculated at a new datum relative to a datum of the seismic receivers. The pressure wave-fields may be spatially resampled at another new datum. In one application, the characteristic is related to the pressure wave-fields being deghosted and calculated at a new datum relative to a datum of the seismic receivers.

The method may also include denoising the model p prior to applying the L' transform. In one application, the characteristic is related to the pressure wave-fields being interpolated at positions designed to match positions of receivers from another seismic survey. The positions may be equidistant from input streamers on which receivers are distributed, or they may be on a regular grid. The first domain may be a time-space domain, and the second domain may be one of a radon, tau-p, frequency-wave number, SVD, rank reduction, tau-p and curvelet domain.

According to another embodiment, it is possible to implement a method for processing input seismic data d that outputs only particle motion or only hydrophone recordings. The method includes a step of receiving input seismic data d recorded in a first domain by seismic receivers that travel in water, with the input seismic data d including pressure and particle motion measurements; a step of generating a model p in a second domain to describe input seismic data d, wherein there is a mathematical transform L which, when applied to model p, results in input seismic data d; and a step of processing with a mathematical transform L' the model p to obtain, in the first domain, a seismic dataset indicative of particle motion wave-fields. Mathematical transform L' is different from mathematical transform L. In one application, the step of generating a model is based on an L transform which incorporates a differentiation in time or space. This differentiation step converts particle velocity data to particle acceleration, or particle displacement data to particle velocity data, or particle velocity data to pressure gradient data, etc. The differentiation may be applied in the time domain or the frequency domain and may be a differentiation in time or in space. In another application, the step of generating a model is based on an L transform which includes a frequency filter term to account for different signal to noise ratios for pressure and particle motion data.

In one application, the seismic dataset indicative of particle motion wave-fields is interpolated among receiver positions and is free of surface ghost wave-fields. The L transform may include vector rotation corrections for particle motion measurements which allows each particle motion receiver to take its own unique orientation. The seismic dataset indicative of particle motion wave-fields may be calculated at a new datum relative to a datum of the seismic receivers, or the seismic dataset indicative of particle motion wave-fields is spatially resampled at another new datum. In one application, the seismic dataset indicative of particle motion wave-fields is deghosted and calculated at a new datum relative to a datum of the seismic receivers.

In one application, the method includes a step of denoising model p prior to applying the L' transform. The seismic dataset indicative of particle motion wave-fields may be interpolated at positions designed to match positions of receivers from another seismic survey. The positions may be equidistant from input streamers on which receivers are distributed, or may be on a regular grid. In one application, the seismic dataset indicative of particle motion wave-fields is used for generating a final image of a surveyed subsurface.

Another embodiment that takes advantage of the L matrices discussed above relates to the use of multicomponent measurements for combined deghosting and redatuming. Fewer component measurements may be used where S/N ratio and sampling allow, e.g., hydrophone only or particle motion only. The strategy described next is aimed at improving spatial image resolution in the image domain (after migration).

Figure 9:
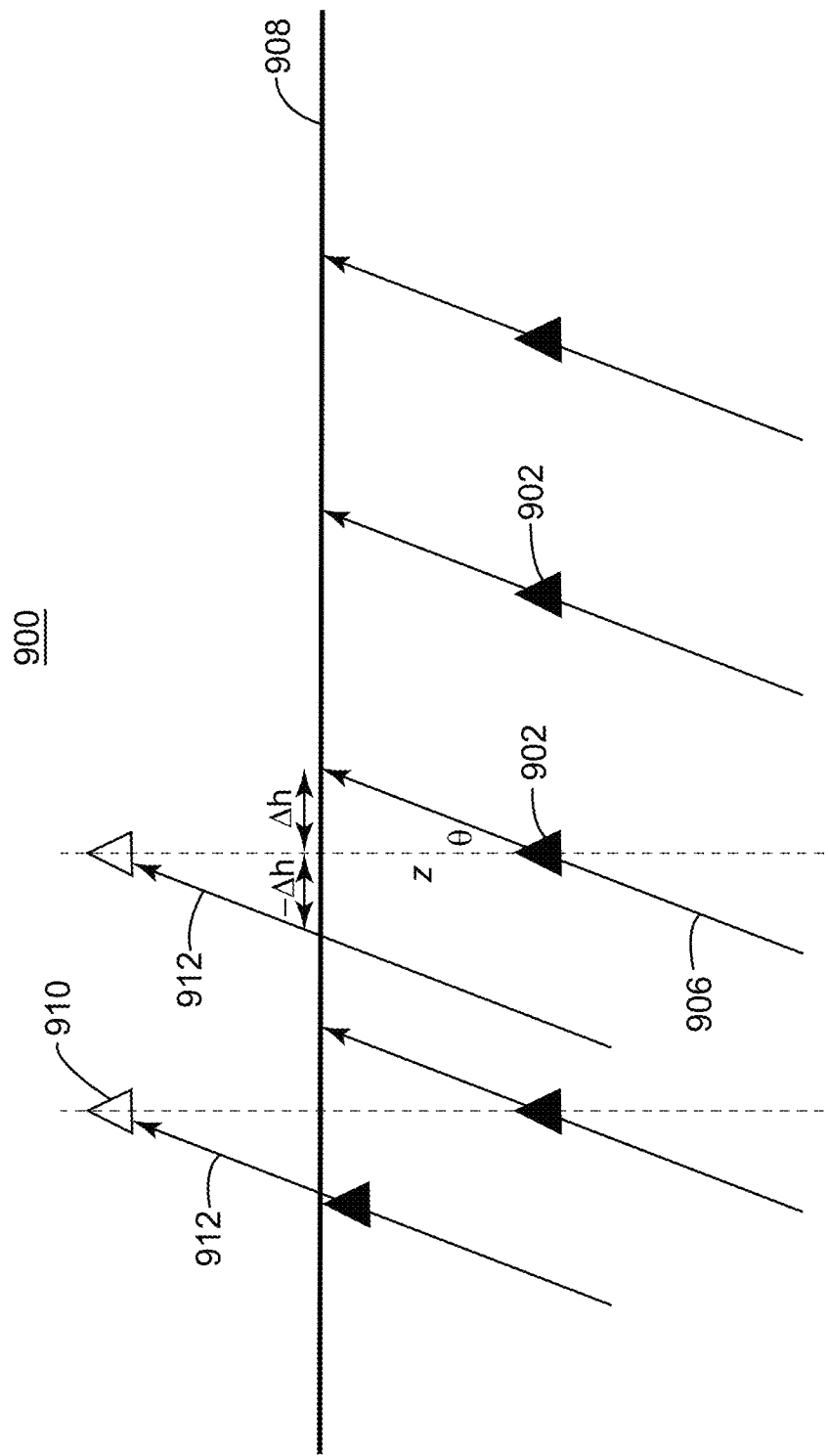
FIGS. 9-11 illustrate seismic data redatuming based on input multicomponent data.

For illustrating the combined deghosting and redatuming, FIG. 9 shows an acquisition system 900 that includes streamers 902 with 100 m separation traveling into the page. For a given cross-line slowness propagation direction, there is a lateral shift $\Delta h$ with which rays 906 reach the sea surface 908 relative to the streamers, and this separation is given by:

$$\sin\theta = vp = \frac{\Delta h}{\sqrt{\Delta h^2 + z^2}} \quad (29)$$

$$\Delta h = \frac{vpz}{\sqrt{1 - v^2 p^2}}, \quad (30)$$

where p is the slowness (s/m) of a given wavefront and v is the water velocity.

Even though there is a lateral shift $\Delta h$, it should be noted that the spatial sampling of the up-going energy (receivers below the sea surface) is the same at the sea surface as it is at the streamers' level (in this case 100 m). Considering now the sampling of the ghost wave-field, the concept of "mirror-receivers" may be used to position mirror-streamers 910 having receivers above the sea surface 908 above the actual receivers streamers as illustrated in FIG. 9, which shows that the surface spatial shift of rays 912 for down-going (ghost) data has opposite polarity to that of up-going (primary) rays 906.

Figure 10:
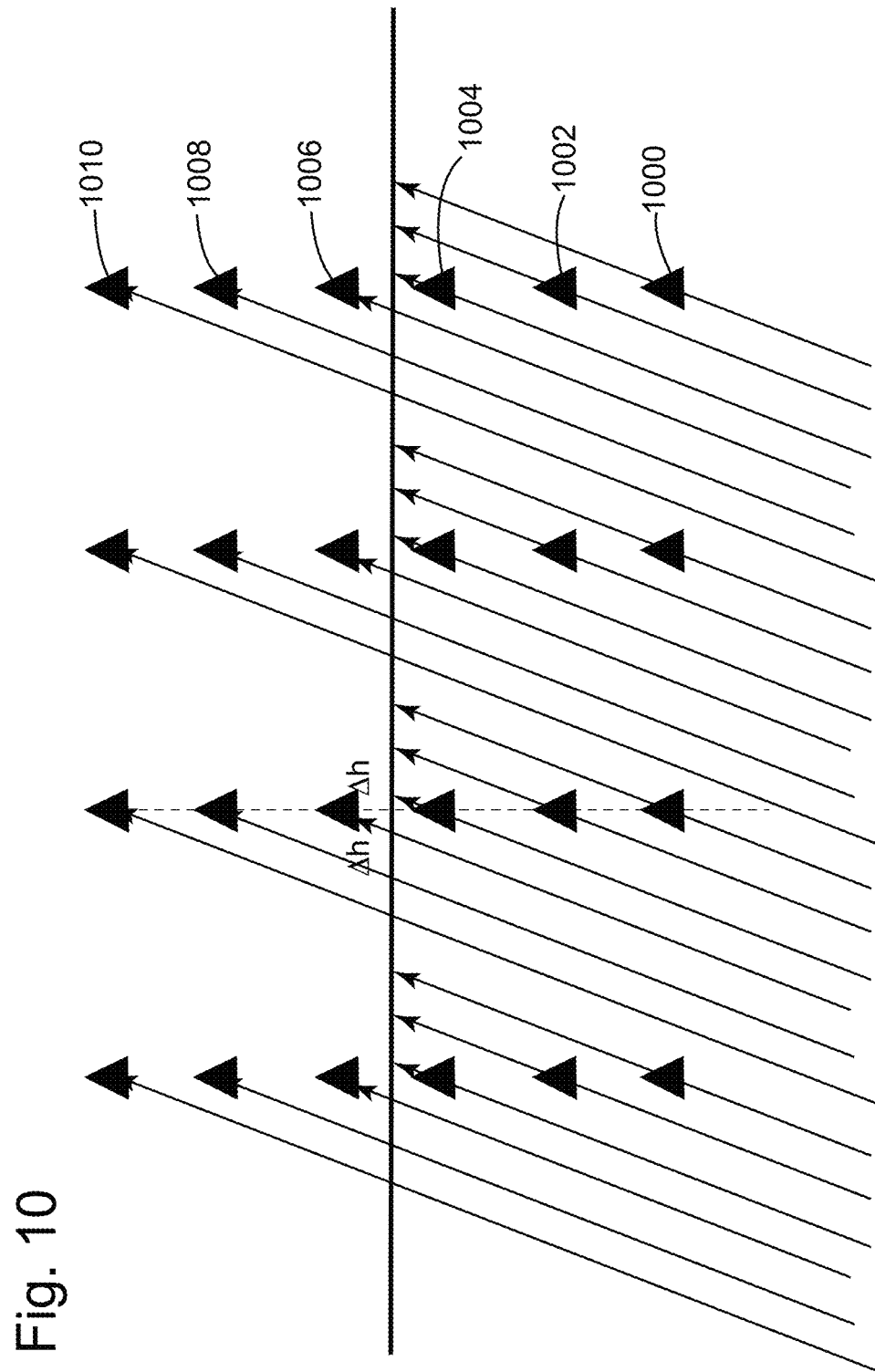
Figure 11:
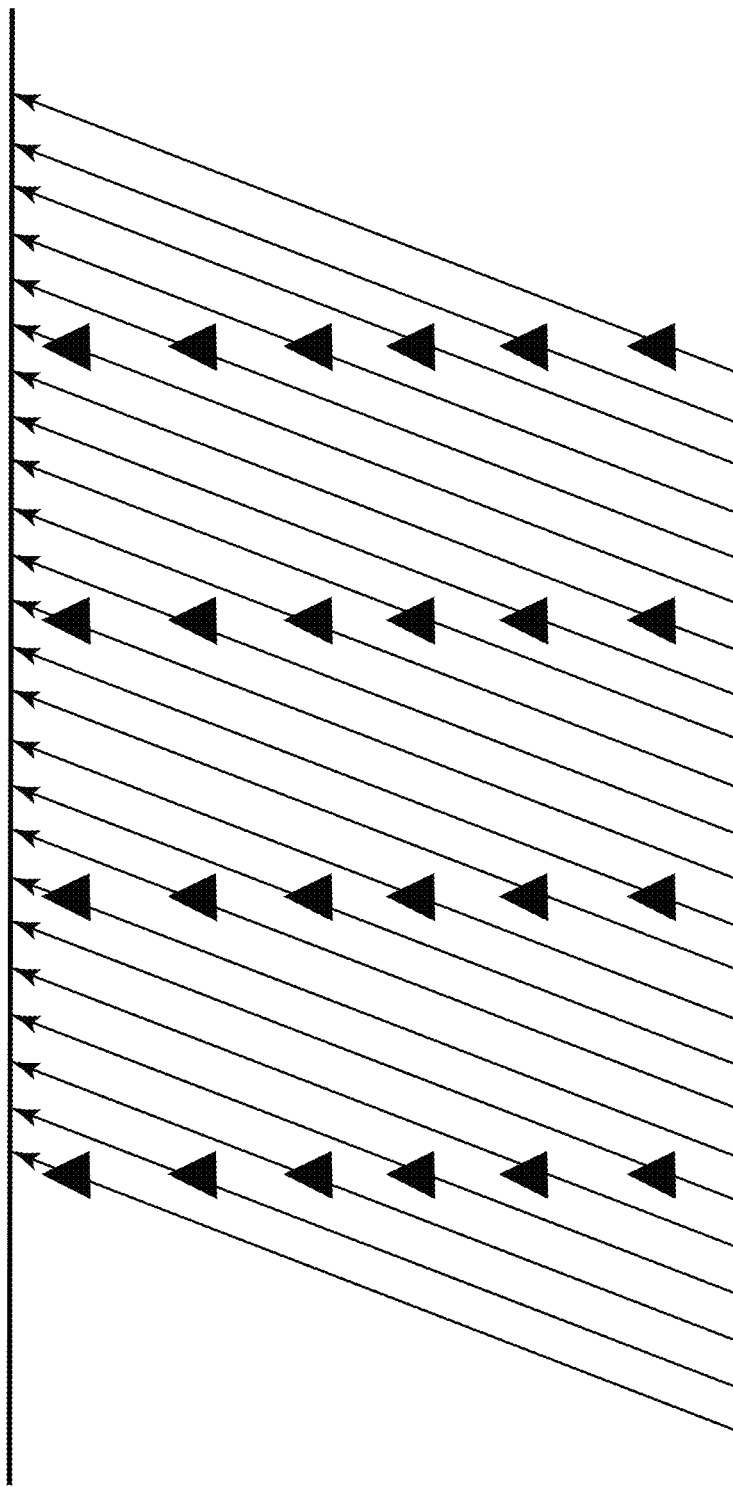

Based on this observation, according to an embodiment, it is possible to increase effective spatial sampling without interpolating data in between the streamers. For example, consider the case in which single or multicomponent data is available. This data may be used to jointly deghost and redatum to a plurality of different depths, thus increasing the amount of data. If, for example, it is desired to increase six-fold the spatial resolution for a given dip, it is possible to choose six horizontal datums 1000-1010 for the output data as shown in FIG. 10. While FIG. 10 illustrates this concept with receivers below (associated with the primaries) and above (associated with the ghosts) the sea surface, the same can be achieved with receivers only below the surface as shown in FIG. 11.

The previous illustrative example describes pictorially how spatial resolution may be improved by redatuming the data to a plurality of recording depths. In one embodiment, this redatuming is combined with deghosting. Thus, ghost receiver data should be prepared to have the same polarity as receivers below the water surface. However, in practical situations, it may be attractive to reconstruct receivers above the ocean bottom, especially in the case of shallow water depths or where there is a strong water velocity variation.

Figure 12:
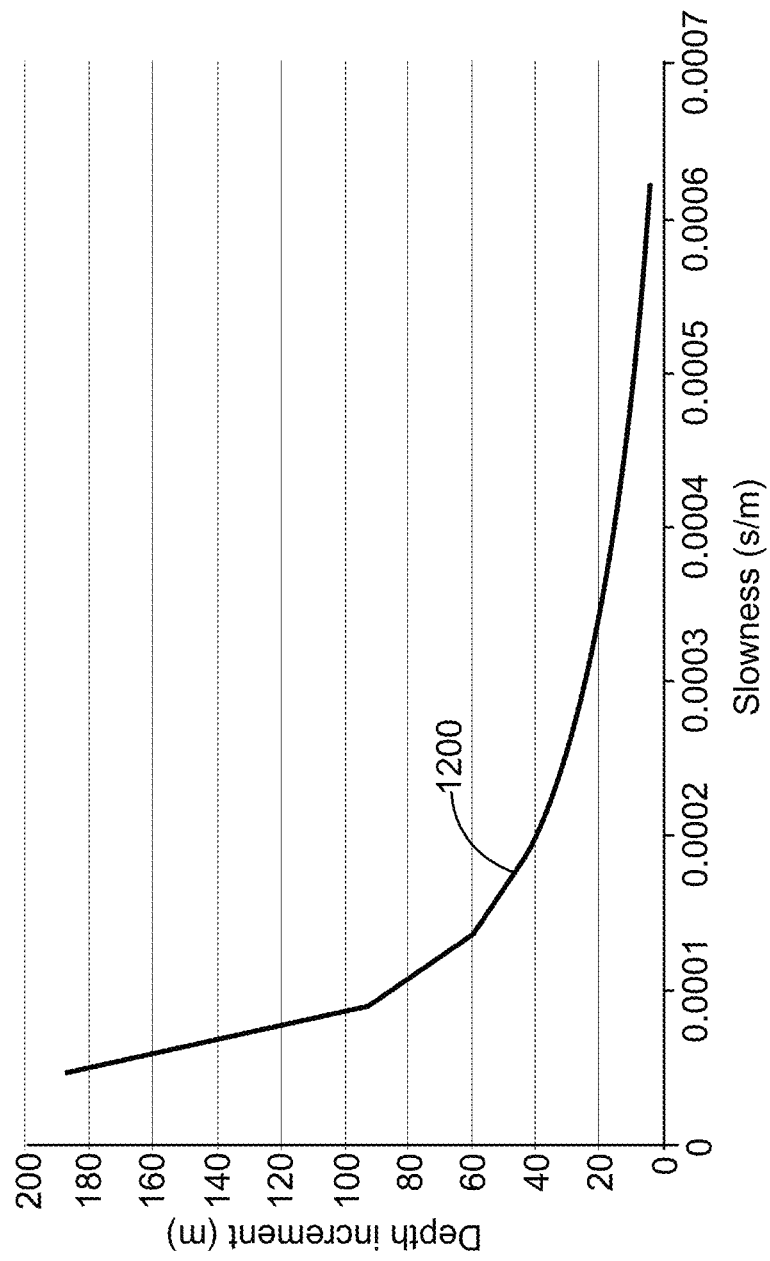
FIG. 12 illustrates a depth sampling versus slowness for a given streamer.
Figure 14A:
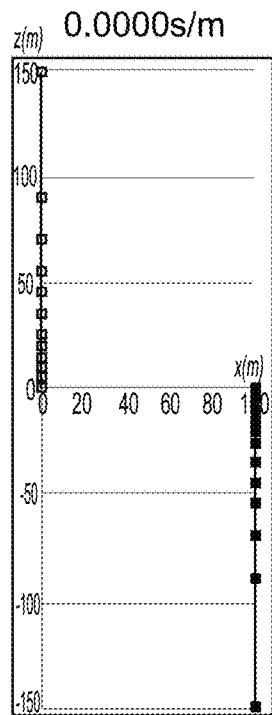
FIGS. 14A-G illustrate surface spatial sampling for output seismic data.
Figure 14B:
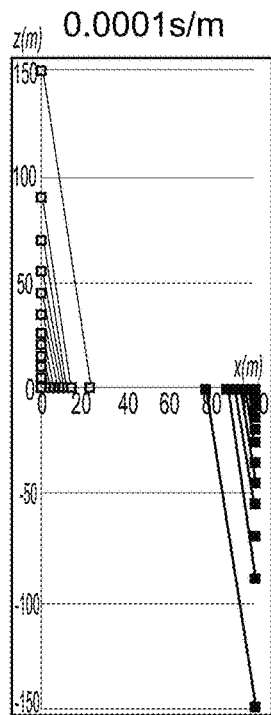
Figure 14C:
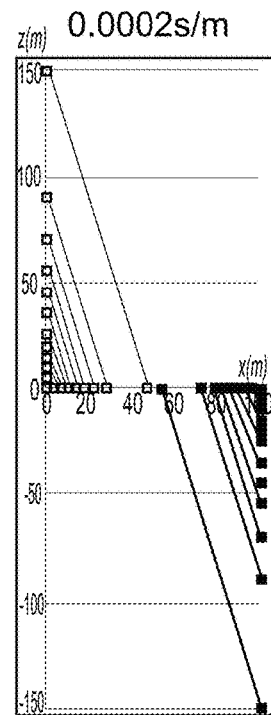
Figure 14D:
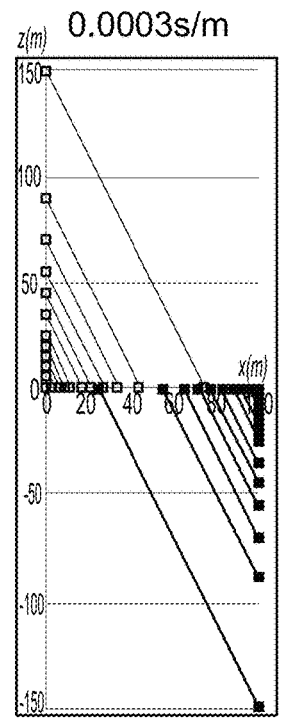
Figure 14E:
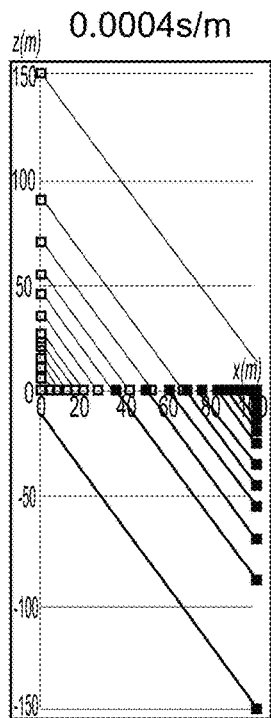
Figure 14F:
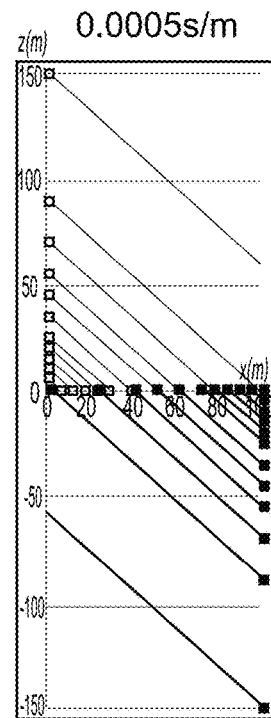
Figure 14G:
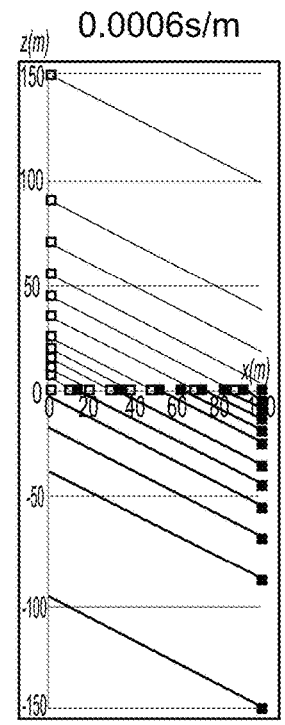

Next, some practicalities of this concept are considered based on an example. Consider a survey with maximum cross-line dip (slowness) of 0.0005 s/m, and an increase from 100 m sampling to 12.5 m sampling in spatial resolution is desired. Rearranging equation (30) as noted below in equations (31) to (33), it can be seen that the increase in spatial resolution may be achieved through a depth increment of 11 m as follows:

$$\Delta z = \frac{\Delta h \sqrt{1 - v^2 p^2}}{vp} \quad (31)$$

$$\Delta z = \frac{12.5\sqrt{1 - 1500^2 \times 0.0005^2}}{1500 \times 0.0005} \quad (32)$$

$$z = 11.02 \, m \quad (33)$$

i.e., the deghosted virtual streamers' output is calculated at 0 m, 11 m, 22 m, 33 m, 44 m, 55 m, 66 m and 77 m. In other words, for fixed streamer spacing, the virtual streamer depth sampling is a function of water velocity, required horizontal resolution ($\Delta h$) and maximum slowness (p). Curve 1200 of the graph illustrated in FIG. 12 describes this relationship.

Curve 1200 seems unfavorable for low slownesses because the depth increment increases rapidly. However, it should be noted that effective spatial sampling for low frequencies need not be as fine as for high frequencies. By definition, energy with vertical propagation does not vary laterally. This concept may be defined by spatial aliasing and the Fresnel zone.

The frequency at which data spatially aliases may be given by the following equation:

$$fmax = \frac{v}{2\Delta x \sin\theta} = \frac{v}{2\Delta xvp} = \frac{1}{2\Delta xp} \quad (34)$$

where v=water velocity (m/s); $\Delta x$=spatial sampling, e.g., streamer spacing (m); and p=slowness (s/m). Rearranging equation (34) for delta-x, the spatial sampling is found as a function of slowness:

$$\Delta x = \frac{1}{2pf\max}. \quad (35)$$

For 100 Hz maximum frequency, the spatial sampling required to avoid aliasing and the streamer depth-increment may be calculated as shown in Table 1.

TABLE 1

| Slowness (s/m) | Spatial sampling (m) | Depth increment (m) |
|---|---|---|
| 0.0006 | 8.333333 | 4.315348 |
| 0.00055 | 9.090909 | 6.487211 |
| 0.0005 | 10 | 9.089282 |
| 0.00045 | 11.11111 | 12.44497 |
| 0.0004 | 12.5 | 17.01727 |
| 0.00035 | 14.28571 | 23.5902 |
| 0.0003 | 16.66667 | 33.63464 |
| 0.00025 | 20 | 50.21793 |

TABLE 1-continued

| Slowness (s/m) | Spatial sampling (m) | Depth increment (m) |
| --- | --- | --- |
| 0.0002 | 25 | 80.67466 |
| 0.00015 | 33.33333 | 146.4034 |
| 1E−04 | 50 | 334.1174 |
| 5E−05 | 100 | 1347.646 |

Note that, in practice, effective spatial sampling for migration may often be finer than this by a factor of 2 for a pair of sources (flip and flop sources used routinely with dual-source single vessel acquisition). However, in practice it is necessary to go down to a depth of about 150 m.

While FIG. 10 shows consistent spatial sampling for a given slowness, for other slownesses with the same depths this will not be the case, as illustrated in FIG. 13. In this case can be seen a fine spatial sampling 1302 followed by a gap 1304. As long as the gap is smaller than the aliasing condition for the given dip, the resolution will still be sufficient. While it is possible to continue the fine receiver depth sampling deeper (almost to have a "curtain streamer") to fill the surface sampling, it can be more efficient to have a varying streamer depth sampling because the sampling gets coarser with depth.

In this respect, FIGS. 14A-G illustrate (vertical axis corresponds to depth, and horizontal axis corresponds to inline direction) left-hand side dots aligned vertically that relate to mirror streamer positions for streamer 1, and right-hand side dots that relate to streamer positions for streamer 2. Streamer depths are as follows: 0 m, 5 m, 10 m, 15 m, 20 m, 25 m, 35 m, 45 m, 55 m, 70 m, 90 m, 150 m. Surface projections of different plane waves recorded by the receivers illustrated in FIGS. 14A-G show that the surface spatial sampling will be sufficient for the spatial resolution required for all plane waves, based on aliasing figures quoted in Table 1.

Another alternative is to have two "curtain streamers" at either edge of the streamer spread. Although this solution may seem to relate to a degradation of spatial resolution, however, based on the schemes discussed herein, it may be appreciated that a similar spatial resolution may be obtained.

For a densely spatially sampled dataset on a horizontal datum, it is well known that by transforming the data into the tau-px-py domain and applying phase shifts for each slowness trace, the input datum may be moved to another fixed level, i.e., 1. Receive data in the (t, x, y) domain;
2. Transform it to the (tau, $p_x$, $p_y$) domain;
3. Apply phase (time) shifts for each slowness trace (i.e., same or different shifts trace by trace); and
4. Reverse transform the data to the (t, x, y) domain.

For a single curtain receiver, a similar process may be implemented, i.e.:

1. Receive data in the (t, y, z) domain;
2. Transform it into the (tau, $p_y$, $p_z$) domain;
3. Apply phase (time) shifts for each slowness trace (i.e., same or different shifts trace by trace); and
4. Reverse transform to the (t, y, z) domain.

In the first case, data at different receiver depths is generated using the (tau, $p_x$, $p_y$) domain, while in the second case data is generated at different y-positions (i.e., lateral sampling) using the (tau, $p_y$, $p_z$) domain. Therefore, instead of spatially interpolating data and performing the migration, it is possible to extrapolate the data to different receiver depths and then migrate it. In other words, it is possible to receive input seismic data while in tow, use the input seismic data to generate data at a plurality of different receiver depths, and then image the subsurface. The input data may include hydrophone data, or particle velocity data, or both. In one application, the data at different receiver depths is substantially free of free surface ghosts (down-going energy) or is substantially free of primary energy (up-going energy). Receivers may be below or above the free surface, they may be provided at receiver depths that are regularly or not spaced in depth, and/or the receiver depths may be designed to optimize spatial resolution at the sea surface or along subsurface structures of interest. Models in $p_x$, $p_y$, and $p_z$ may be linked through the inverse square of the water velocity through equation: $v^{-2}=p_x^2+p_y^2+p_z^2$.

The following comments relate to the design and use of the L matrix discussed above. Particle velocity data may be obtained from individual sensors, or summed (average or weighed sum) to form a receiver group. Particle velocity data may have been acquired directly or may be computed from accelerometer sensors (for example, by integration). Other types of particle motion sensor may be available. While the above embodiments relate to modeling of particle velocity data, a differentiation step may be included in the matrix formulations to work directly with accelerometer data. The differentiation could be applied in the time or the frequency domain. Receivers generate a marine streamer dataset that is achieved in a narrow, wide or multi-azimuth, coil shooting or any configuration towed with constant or variable depth (e.g., slant streamer, BroadSeis profile, over-under streamers), and the seismic data is generated with an air gun, marine vibrator, or other source element. Source elements may be fired according to any known scheme, e.g., continuously, simultaneously, flip-flop, etc. Receivers may also be used in ocean bottom survey (nodes, cables, or other with air gun, marine vibrator or other source), land dataset (dynamite, vibrator or other source), or a combination of two or more dataset types. The data may have been calibrated before applying the processes discussed herein, or calibration scalars may be included in the matrix formulations noted in the embodiments. Water velocity terms may be constant or allowed to vary with depth. Variation with depth can be of use for OBS datasets where there is a water velocity gradient. The methods may be used for one-sided or split-spread acquisition.

Equations described herein may be solved in the time domain or a spectral domain (e.g., frequency, Laplace, z-transform, etc.), wavelet domain (e.g., curvelet or other). Model p may be found through any inversion method, e.g., conjugate gradients, LU decomposition, Cholesky factorization, etc. Model p may be derived to represent all traces in the input shot, or may work on a subset of data from the input shot, for example, spatial windows of a given number of channels. Sparseness weights may be used in the inversion to improve results, for example, where there is poor signal-to-noise ratio or to overcome aliasing; e.g. iteratively reweighted least squares beginning with low frequencies and working up to higher frequencies. Other model domains may be used, for example, frequency-wavenumber (FK), parabolic Radon, hyperbolic Radon, etc. In fact, any fixed datum model domain may be defined as long as it can be reverse transformed, redatumed and reghosted for both hydrophone and particle velocity sensor data. Alternatively, an iterative approach similar to the anti-leakage tau-p transform can be used which also exhibits sparseness properties. No matter how the model is formed, it needs to simultaneously reproduce the hydrophone and particle velocity measurements through application of an operator, e.g., L.

Due to differing signal to noise ratio of hydrophone and particle velocity data, it may be necessary to define the inversion so as to satisfy the hydrophone data for a broader bandwidth than the particle velocity data. This may be implemented by including a frequency dependent scaling term into the matrix or bandpass filtering the model and data for different conjugate gradient passes either by multiplication in the frequency domain or convolution by a bandpass filter in the time domain. For example, application of L may include a bandpass filter so that when applied the bandwidth of particle velocity components is 25 Hz to 250 Hz, whereas the bandpass filter for hydrophone data is 2 Hz to 250 Hz. Conjugate gradient inversion begins by computing $L^T d$ from d, and continues by combining frequency filtering into L. The bandwidth of $L^T d$ will automatically be adjusted and be consistent for the later applications of L and $L^T$ in the conjugate gradient flow.

It can also be possible to process hydrophone and particle motion data independently. The separate results may be combined afterwards, for example, by selecting different temporal frequency ranges based on signal-to-noise ratio data. At low frequencies, particle velocity data may be too noisy to be of value. Therefore, it may be necessary to use a pressure-only solution for low frequencies, and make use of a combined hydrophone-particle velocity solution for higher frequencies.

A generalized weighting scheme can be implemented to vary weighting between any component (hydrophone or particle motion) depending on the receiver, time and frequency and/or wavenumber. This weighting refers to how well the model represents the data. Typically, accelerometer data is integrated to calculate particle velocity measurements. Instead of integrating accelerometer data before wave-field separation, it is also possible to build a differentiation operator into the inversion scheme. In the time domain, the application of operator L would then include redatum, reghost and differentiation. As an alternative to the described modeling approach, other forms of wave-field extrapolation may be used, which may include Kirchhoff, beam, wave-equation (one-way or two-way, RTM, etc).

The embodiments discussed above with regard to determining the L matrix have focused on illustrating how the mathematics works and how the various steps, e.g., deghosting, datuming, interpolation, denoising, etc. are achieved by modifying the L matrix. The next embodiments describe possible implementations of these steps according to methods that are now discussed.

Figure 15:
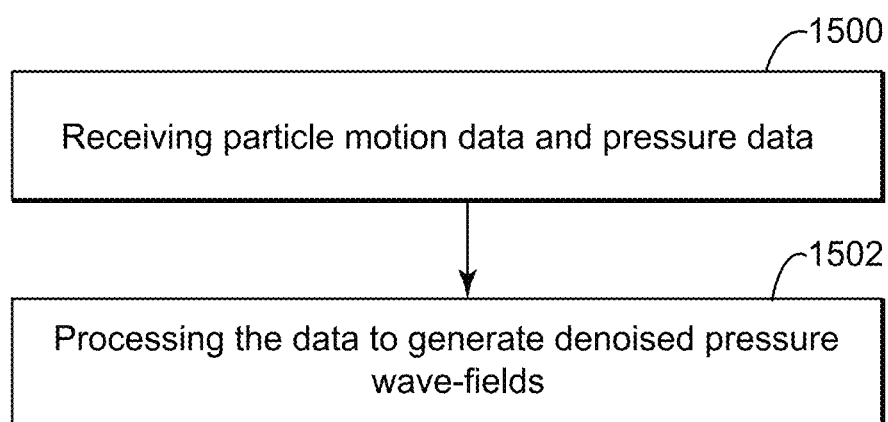
FIG. 15 is a flowchart of a method for generating output denoised pressure data.

According to one embodiment, it is possible to design the L matrix so that joint interpolation, deghosting and/or denoising is achieved using multicomponent streamer measurements. The method may include, as illustrated in FIG. 15, a step 1500 of receiving particle motion data and pressure data from seismic receivers towed by a vessel. The receivers may be part of a plurality of streamers, ocean bottom cable or autonomous underwater vehicles. The pressure and particle motion data includes surface ghosts. The method also includes a step 1502 of processing particle motion data and pressure data to generate a data set indicative of a denoised pressure wavefield, at positions between the streamers and substantially free of surface ghosts. To achieve this processing step, the model p is determined, then, in the model domain, the noise is muted and then an L' matrix is applied to reverse transform the data, deghost and interpolate. Prior or after the step of muting the noise, the model p may be used for wavefield separation. The L' matrix is designed to produce new offset-x and offset-y positions to take care of the interpolation, and also to remove surface ghosts. Thus, the data d' obtained in the time domain as a result of the L' matrix, which may include only surface ghosts, is subtracted from original data d to obtain only primaries.

In one application, if the accelerometer data is noisy, which tends to be inherent particularly at low frequencies, instead of first denoising the data in the p model, followed by interpolation and deghosting with matrix L', the whole process may be integrated into the L' matrix thanks to the use of sparseness weights.

Figure 16:
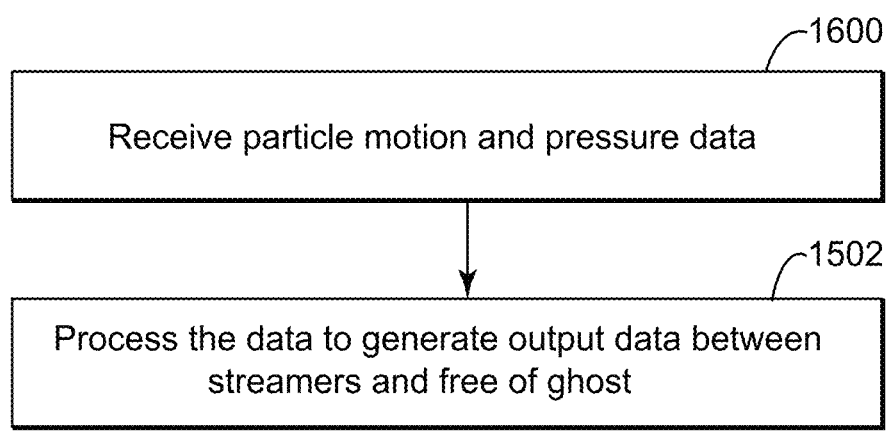
FIG. 16 is a flowchart of a method for generating deghosted and interpolated output seismic data.

According to another embodiment, joint interpolation and deghosting using multicomponent streamer measurements may be implemented without a denoising step as discussed in the embodiment of FIG. 15. Thus, for this method, as illustrated in FIG. 16, there is a step 1600 of receiving particle motion data and pressure data from seismic receivers that are towed, and the pressure and particle motion data includes surface ghosts. A next step 1602 processes particle motion data and pressure data to generate a data set representative of particle motion at positions between the streamers (i.e., interpolation) and substantially free of surface ghosts (i.e., deghosting). This method differs from the previous method in the sense that the step of denoising in the p model is skipped, and the output data set represents particle motion instead of pressure data.

Note that there can be general benefit of processing particle motion data rather than pressure data because particle motion data provides information about the orientation of the wave-field that can be useful for demultiple, interference noise removal, etc. Further, each particle motion component (for example, vx, vy, vz) at different points in the processing sequence may be processed independently or jointly. After migration, the data may be combined to simulate a pressure wave-field.

According to still another embodiment, it is possible to perform joint interpolation and deghosting using multicomponent streamer measurements. The method includes a step of receiving particle motion data and pressure data as in the previous methods, and a step of processing particle motion data and pressure data to generate a data set representative of a pressure wave-field at positions between the streamers (interpolation) and substantially free of up-going primary energy. The difference with the previous method is that instead of particle motion data, pressure data is calculated so that it is free of primaries and not of ghosts, i.e., the calculated pressure data includes ghosts and not primaries. Note that working with down-going (ghost) data can produce similar results to working with up-going (primary) data. In some environments, better imaging can be achieved using mirror migration of ghost energy rather than regular migration of primary energy. The output data may be at the same datum as the input or a new datum, i.e., combining removing up-going energy, redatuming, and interpolation.

Figure 17:
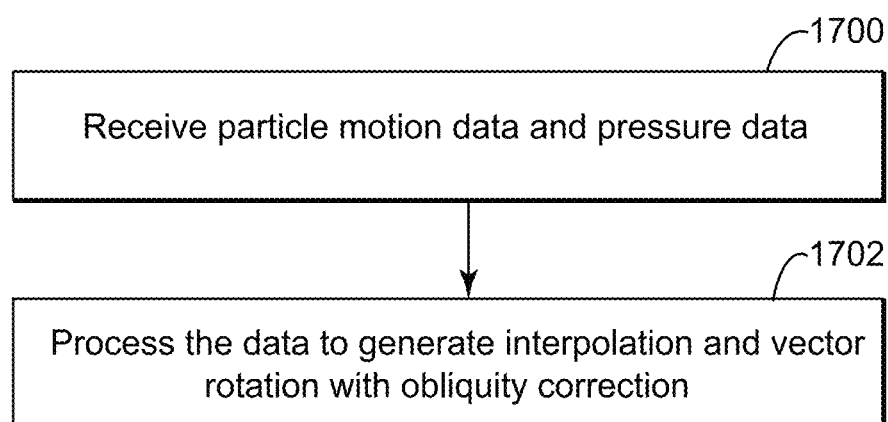
FIG. 17 is a flowchart of a method for generating interpolated and obliquity-corrected output seismic data.

According to yet another embodiment illustrated in FIG. 17, output seismic data may be generated that includes vector rotation and obliquity correction using multicomponent streamer measurements. More specifically, as illustrated in the figure, in step 1700, particle motion data and pressure data is received as in the previous embodiments. In step 1702, particle motion data and pressure data are processed to perform interpolation of the pressure wave-field and/or vector rotation with or without obliquity correction (see equation (6) and associated description and also FIG. 8 and associated description). The processing step determines a model p based on input hydrophone and particle velocity data d as before, e.g., tau-$p_x$-$p_y$ model. However, instead of using this model p for combined interpolation and deghosting, it may be used only for interpolation/regularization of pressure and particle velocity data. Particle velocity data may be at a different orientation relative to input data and, thus, the particle velocity data may or may not be compensated for obliquity correction.

In one application, output data may not be interpolated. In this case, particle motion data may or may not be corrected for obliquity. The output $V_z$ measurements may subsequently be summed with pressure data in the data space d to perform wave-field separation through P-$V_z$ summation. Wavefield separation through P-$V_z$ summation is known in the field and, thus, this process is omitted herein.

Alternatively, the summation may be made post- or during migration. In still another application, pressure P and particle velocity $V_z$ data may be processed through migration. Four migrations may be used: migration and mirror migration for both P and Vz data. Following these steps, a (quadruple) joint deconvolution or modeling approach could be used to estimate the reflectivity (ghost-free data). The joint deconvolution or modeling approach generates a single reflectivity model that simultaneously satisfies all four datasets.

According to still another embodiment, collected data may be processed to obtain only deghosted data, i.e., no interpolation step. According to this method, there is a step of receiving particle motion data and pressure data as in the previous methods, and a step of processing particle motion data and pressure data to generate a data set representative of a pressure wave-field at positions along the streamers, and the pressure wave-field is substantially free of surface ghosts. The output data set may include traces at the positions of the receivers along streamers or between the receivers, or both.

According to yet another embodiment, there is a method for elimination of cross-talk noise (if a simultaneous shooting scheme is used) or interference noise from another survey. The method includes a step of receiving particle motion data and pressure data as discussed with regard to previous methods, a step of processing particle motion data and pressure data to remove simultaneous shooting cross-talk noise or interference noise, and a step of outputting pressure and particle velocity data along the streamers, free of ghosts. The processing step may take place in the model domain and may uses traditional algorithms for identifying cross-talk noise or interference noise.

According to yet another embodiment, it is possible to have a method that receives the same data as in previous methods, then processes particle motion data and pressure data to generate a data set representative of a pressure wave-field at a new first datum, and then spatially resamples the data indicative of particle motion and pressure data at a second new datum. Redatum data may include surface ghosts, or it may be substantially free of surface ghosts, or it may be substantially free of up-going (primary) energy.

According to another embodiment, there is a method that combines deghosting with spatial resampling. For example, the method includes a step of receiving particle motion data and pressure data as in the previous methods and a step of processing particle motion data and pressure data to generate a data set representative of a pressure wave-field substantially free of surface ghosts at new spatial positions. New spatial positions may be at a new depth, or at a new depth and resampled in lateral position.

According to yet another embodiment, there is a method for processing input seismic data d that includes a step of receiving input seismic data d recorded in a first domain by seismic receivers that travel in water, with the input seismic data d including primary and surface ghost wave-fields, wherein the input seismic data includes both pressure and particle motion measurements; a step of generating a model p in a second domain to describe input seismic data d; and a step of processing model p to obtain multiples in the second domain, wherein the multiples are representative of primary wave-fields reflected at the water free surface or in the earth (internal multiples). The method may further include transforming the multiples back to the first domain, and subtracting the multiples from input seismic data d to obtain final data d' based on which a final image of the earth is generated. In one application, the step of processing involves applying a convolution in the second domain to estimate multiples energy.

Figure 18:
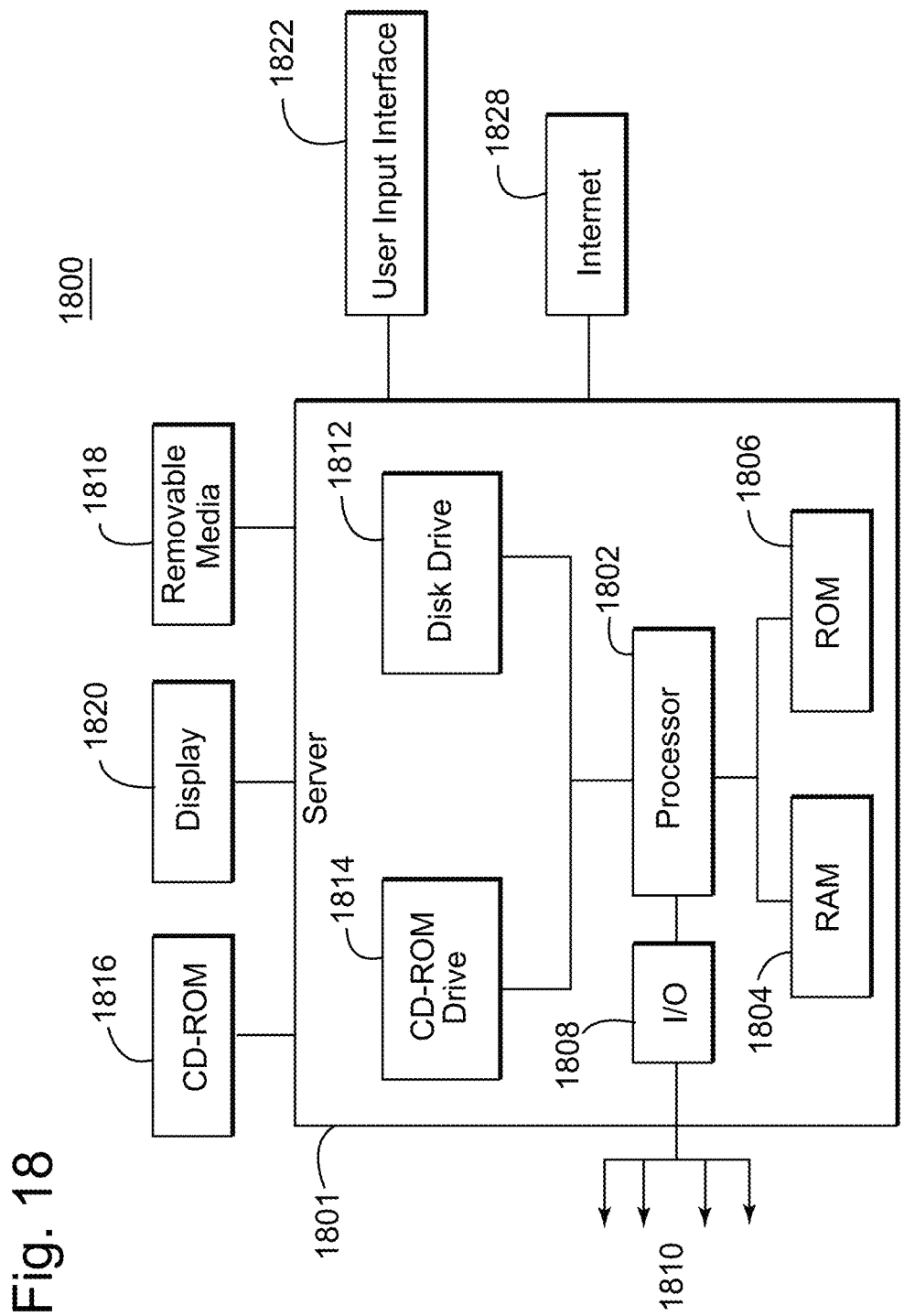
FIG. 18 is a schematic diagram of a computing device configured to implement a deghosting method according to an exemplary embodiment.

The above-discussed procedures and methods may be implemented in a computing device as illustrated in FIG. 18. Hardware, firmware, software or a combination thereof may be used to perform the various steps and operations described herein. Computing device 1800 of FIG. 18 is an exemplary computing structure that may be used in connection with such a system.

Exemplary computing device 1800 suitable for performing the activities described in the exemplary embodiments may include a server 1801. Such a server 1801 may include a central processor (CPU) 1802 coupled to a random access memory (RAM) 1804 and to a read-only memory (ROM) 1806. ROM 1806 may also be other types of storage media to store programs, such as programmable ROM (PROM), erasable PROM (EPROM), etc. Processor 1802 may communicate with other internal and external components through input/output (I/O) circuitry 1808 and bussing 1810 to provide control signals and the like. Processor 1802 carries out a variety of functions as are known in the art, as dictated by software and/or firmware instructions.

Server 1801 may also include one or more data storage devices, including hard drives 1812, CD-ROM drives 1814 and other hardware capable of reading and/or storing information, such as DVD, etc. In one embodiment, software for carrying out the above-discussed steps may be stored and distributed on a CD-ROM or DVD 1816, a USB storage device 1818 or other form of media capable of portably storing information. These storage media may be inserted into, and read by, devices such as CD-ROM drive 1814, disk drive 1812, etc. Server 1801 may be coupled to a display 1820, which may be any type of known display or presentation screen, such as LCD, plasma display, cathode ray tube (CRT), etc. A user input interface 1822 is provided, including one or more user interface mechanisms such as a mouse, keyboard, microphone, touchpad, touch screen, voice-recognition system, etc.

Server 1801 may be coupled to other devices, such as sources, detectors, etc. The server may be part of a larger network configuration as in a global area network (GAN) such as the Internet 1828, which allows ultimate connection to various landline and/or mobile computing devices.

The above embodiments have presented various algorithms for processing input seismic data d. Those embodiments are now summarized for a better understanding of the claimed methods. Literal references are provided for each embodiment and numeral references are provided for the various features associated with a given embodiment. The following embodiments are just exemplary and not intended to limit the invention. The features for the embodiments are listed with a corresponding numeral reference and each feature may work with any other feature of a respective embodiment. Note that all these features are disclosed above and the following section only organizes these features in an easy to follow way. All the features listed next may be implemented into a computing device such that these calculations are automatically performed. Thus, the processor of a computing device may be configured to execute any of the following features, in combination or not. However, the following list of features is not intended to be exhaustive and other combinations of these features are contemplated.

Embodiment A

Figure 19:
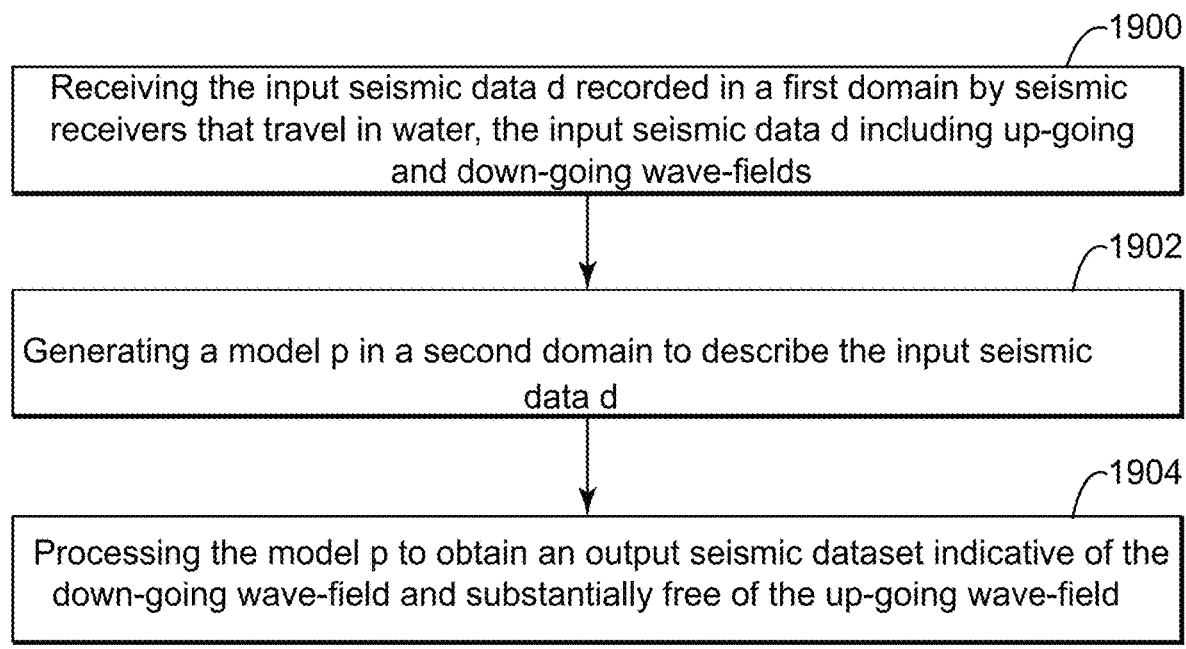
FIGS. 19-26 are flowcharts of methods for processing input seismic data.

1. According to this embodiment, also illustrated in FIG. 19, there is a method for processing input seismic data d, and includes a step 1900 of receiving the input seismic data d recorded in a first domain by seismic receivers that travel in water, the input seismic data d including up-going and down-going wave-fields; a step 1902 of generating a model p in a second domain to describe the input seismic data d; and a step 1904 of processing the model p to obtain an output seismic dataset indicative of the down-going wave-field and substantially free of the up-going wave-field.

2. The input seismic data d includes only pressure measurements.

3. The input seismic data d includes only particle motion measurements.

4. The input seismic data d includes both pressure and particle motion measurements.

5. The output seismic dataset is indicative of pressure measurements and/or particle motion measurements.

6. The first domain is a time-space domain.

7. The second domain is one of a radon domain, frequency-wave number domain, tau-p domain, parabolic domain, shifted hyperbola domain, singular value decomposition, rank reduction and curvelet domain.

8. The step of processing the model p comprises:
applying an L' transform to the model p to obtain the output seismic dataset.

9. The step of processing also includes removing random, coherent or impulsive noise.

10. The coherent noise is cross-talk noise, interference noise or multiple energy.

11. The impulsive noise is cross-talk noise or interference noise.

12. An amount of noise is reduced by scaling or filtering energy associated with the model p prior to or during the application of the L' transform.

13. The L' transform also includes a receiver rotation or obliquity correction.

14. The output seismic dataset indicative of the down-going wave-field is generated at input positions.

15. The seismic dataset indicative of the down-going wave-field is subtracted from the input seismic data d to obtain data d' to be used for generating a final image of a surveyed subsurface.

16. The output seismic dataset indicative of the down-going wave-field is generated at positions different from the input seismic data.

17. The positions are in-between the receivers.

18. The positions are at different depths than the input seismic data.

19. The different depths are at the sea surface.

20. The positions are selected to match positions of receivers from another seismic survey.

21. The positions are equidistant from streamers on which the receivers are distributed.

22. The positions are distributed on a regular grid.

23. The seismic dataset indicative of the down-going wave-field is directly used for generating a final image of a surveyed subsurface.

24. The step of processing the model p comprises:
generating a seismic dataset indicative of the up-going wave-field and subtracting the up-going data from the input data to generate an output dataset substantially free of up-going energy.

Embodiment B

Figure 20:
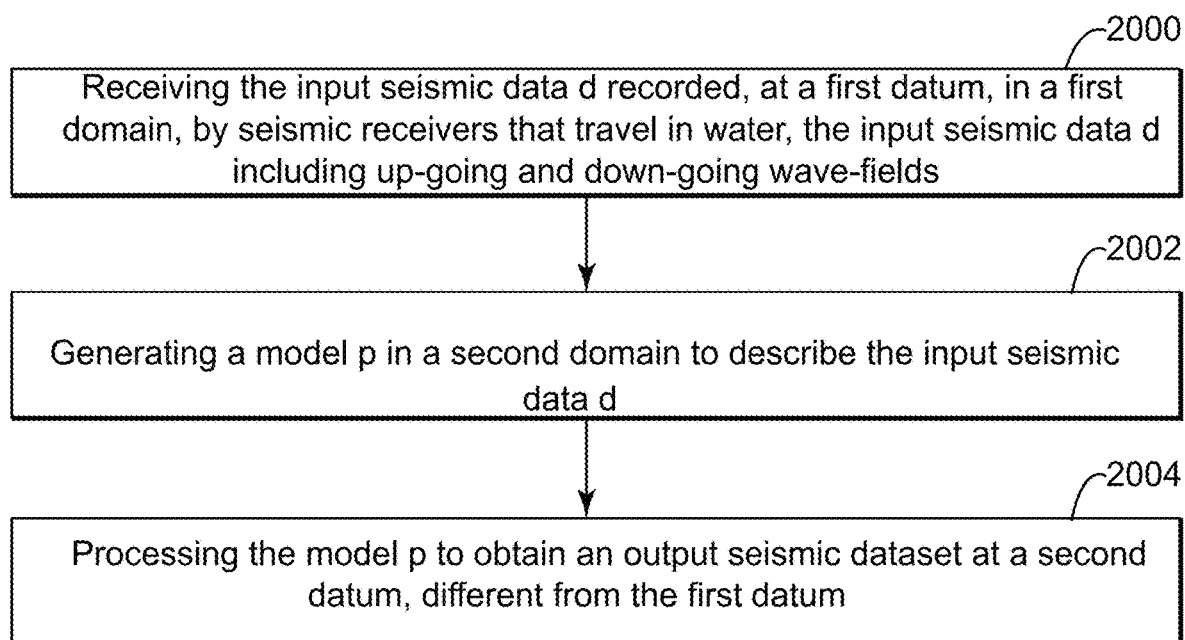

1. According to this embodiment, also illustrated in FIG. 20, there is a method for processing input seismic data d, the method comprising a step 2000 of receiving the input seismic data d recorded, at a first datum, in a first domain, by seismic receivers that travel in water, the input seismic data d including up-going and down-going wave-fields, a step 2002 of generating a model p in a second domain to describe the input seismic data d, and a step 2004 of processing the model p to obtain an output seismic dataset at a second datum, different from the first datum. 2. The output seismic data is substantially free of the down-going wave-field.

3. The output seismic data is substantially free of the up-going wave-field.

4. The output seismic data contains both the up-going wave-field and down-going wave-field.

5. The input seismic data d includes particle motion measurements.

6. The input seismic data d includes pressure and particle motion measurements.

7. The first datum is constant.

8. The first datum varies along an inline direction.

9. The first datum slants along an inline direction.

10. The first datum varies along an inline direction based on a curved shape.

11. The curved shape is a sinusoidal shape.

12. The first datum varies along a cross-line direction.

13. The second datum is constant.

14. The second datum varies along an inline direction.

15. The second datum slants along an inline direction.

16. The second datum varies along an inline direction based on a curved shape.

17. The curved shape is a sinusoidal shape.

18. The second datum varies along a cross-line direction.

19. The second datum is at the water surface level.

20. Plural output seismic datasets are generated at plural receiver depths.

21. The plural receiver depths are selected to maximize spatial resolution.

22. The output seismic dataset is generated at positions different from positions of the input seismic data.

23. The output positions are selected to match positions of receivers from another seismic survey.

24. The output positions are equidistant from streamers on which the receivers are distributed.

25. The output positions are distributed on a regular grid.

26. The output seismic dataset is used for generating a final image of a surveyed subsurface.

27. The first domain is a time-space domain.

28. The second domain is one of a radon domain, frequency-wave number domain, tau-p domain, parabolic domain, singular value decomposition domain, rank reduction domain, shifted hyperbola domain and curvelet domain.

29. The step of processing the model p comprises:
applying an L' transform to the model p to obtain a seismic dataset at the second datum.

30. An amount of noise is reduced by filtering or scaling energy associated with the p model before or when the L' transform is applied.

31. The L' transform also includes resampling.

32. The output seismic dataset is indicative of pressure measurements or particle motion measurements.

33. The L' transform also includes a receiver rotation or obliquity correction.

Embodiment C

Figure 21:
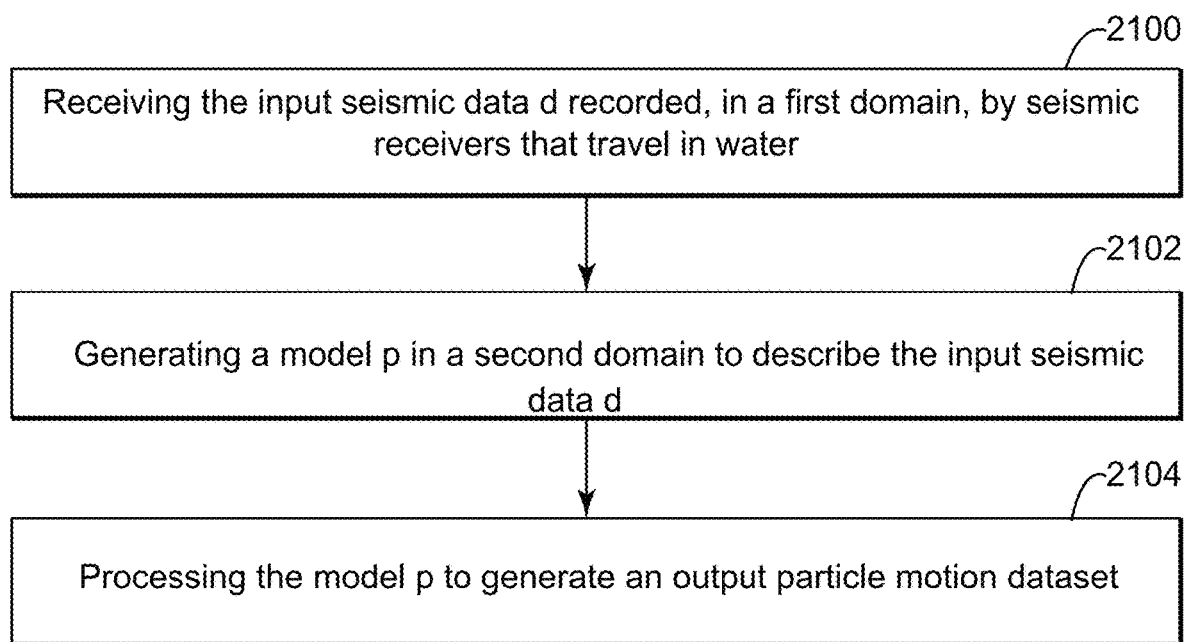

1. According to this embodiment, also illustrated in FIG. 21, there is a method for processing input seismic data d, the method including a step 2100 of receiving the input seismic data d recorded, in a first domain, by seismic receivers that travel in water, a step 2102 of generating a model p in a second domain to describe the input seismic data d, and a step 2104 of processing the model p to generate an output particle motion dataset.

2. The input seismic data d includes only pressure measurements.

3. The input seismic data d includes only particle motion measurements.

4. The input seismic data d includes both pressure and particle motion measurements.

5. The output particle motion dataset is not corrected for obliquity.

6. The output particle motion dataset is corrected for obliquity.

7. The obliquity is defined by an angle between a respective wave-field propagation direction and a receiver orientation.

8. The receiver orientation is defined by an angle relative to gravity.

9. The receiver orientation is defined by an angle relative to the nominal shooting direction.

10. The output particle motion data is re-orientated.

11. The processing step comprises:
wave-field reconstruction of the pressure wave-fields based on the model p.

12. The pressure wave-fields are reconstructed at the same positions as the input seismic data, d.

13. Incoming wave-fields are reconstructed at new receiver positions.

14. The new positions are at different depths to the input data.

15. The new positions are in-between the streamers.

16. The output particle motion dataset includes both an up-going wave-field and a down-going wave-field.

17. The output particle motion dataset is substantially free of the down-going wave-field.

18. The output particle motion dataset is substantially free of the up-going wave-field.

19. The first domain is time-offset/x-offset/y and the second domain is tau-slowness/x-slowness/y, where offset/x is a distance between a source generating the input seismic data d and a corresponding receiver along a first direction and offset/y is a distance between the source and the corresponding receiver along a second direction, which is substantially perpendicular on the first direction.

20. The output particle motion dataset is combined with pressure data in the first domain to obtain wave-field separation.

21. The output particle motion dataset is summed with hydrophone data in the first domain to obtain wave-field separation.

22. The output particle motion dataset is subtracted from hydrophone data in the first domain to obtain wave-field separation.

23. The first domain is a time-space domain and the second domain is one of a radon domain, frequency-wave number domain, tau-p domain, parabolic domain, hyperbolic domain, singular value decomposition domain, rank reduction domain and curvelet domain.

24. The step of generating a model p comprises:
computing the model p by solving an inverse problem based on an L transform; and
applying an L' transform to the model p to obtain the output particle motion dataset, wherein the L' transform combines the obliquity and wave-field reconstruction.

25. The step of processing the model includes removing noise.

26. The step of removing noise includes removing coherent, impulsive or random noise.

27. The noise relates to multiple, cross-talk, or interference noise.

28. An amount of noise is reduced by scaling/filtering the model p or controlling weights when the L' transform is applied.

29. The output particle motion dataset is used for generating a final image of a surveyed subsurface.

30. The output particle motion dataset is subtracted from recorded particle motion data and the remaining energy is denoised.

Embodiment D

Figure 22:
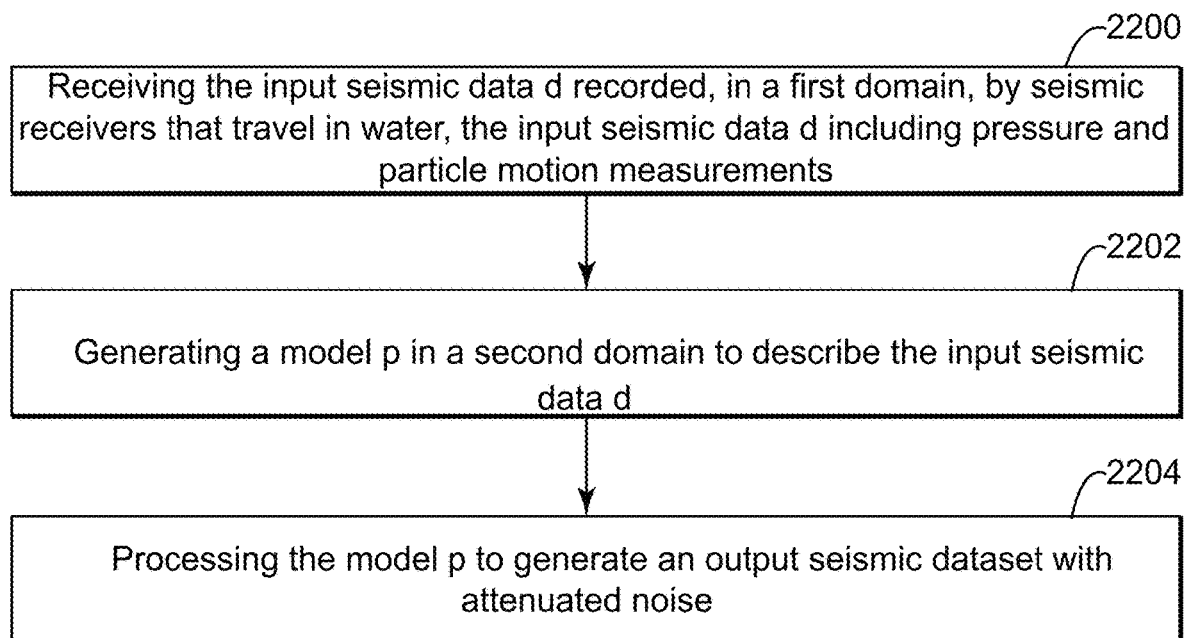

1. According to this embodiment, also illustrated in FIG. 22, there is a method for processing input seismic data d, the method including a step 2200 of receiving the input seismic data d recorded, in a first domain, by seismic receivers that travel in water, the input seismic data d including pressure and particle motion measurements, a step 2202 of generating a model p in a second domain to describe the input seismic data d; and a step 2204 of processing the model p to generate an output seismic dataset with attenuated noise.

2. The noise is coherent, impulsive or random.

3. The noise relates to cross-talk noise, interference noise or multiple noise.

4. The cross-talk noise relates to energy coming from a second vessel involved in the same seismic acquisition.

5. The interference noise relates to a vessel not involved in the same seismic acquisition.

6. The step of processing comprises:
removing noise in the model p by scaling.

7. The method further comprises:
removing the noise based on the non-coherent nature of the model p in the second domain.

8. An amount of noise is reduced by controlling sparseness weights when an L transform is applied.

9. The first domain is a time-space domain.

10. The second domain is one of a radon domain, frequency-wave number domain, tau-p domain, parabolic domain, hyperbolic domain, singular value decomposition domain, rank reduction domain, slowness-shotpoint domain and curvelet domain.

11. The step of generating a model p comprises:
computing the model p by solving an inverse problem based on an L transform; and
applying an L' transform to the model p to obtain the output seismic dataset with attenuated noise.

12. The L' transform applies model masking or scaling or filtering to energy associated with the model p.

13. The L' transform also includes receiver rotation or obliquity correction.

14. The output seismic dataset is at the same positions as the input data.

15. The output seismic dataset is at different positions to input data.

16. The output seismic dataset is obtained after applying a step of wavefield separation.

17. The output seismic dataset contains up-going and down-going wavefields.

18. The output seismic dataset is indicative of a pressure measurement.

19. The output seismic dataset is indicative of a particle motion measurement.

20. The output seismic dataset with attenuated noise is used for generating a final image of a surveyed subsurface.

Embodiment E

Figure 23:
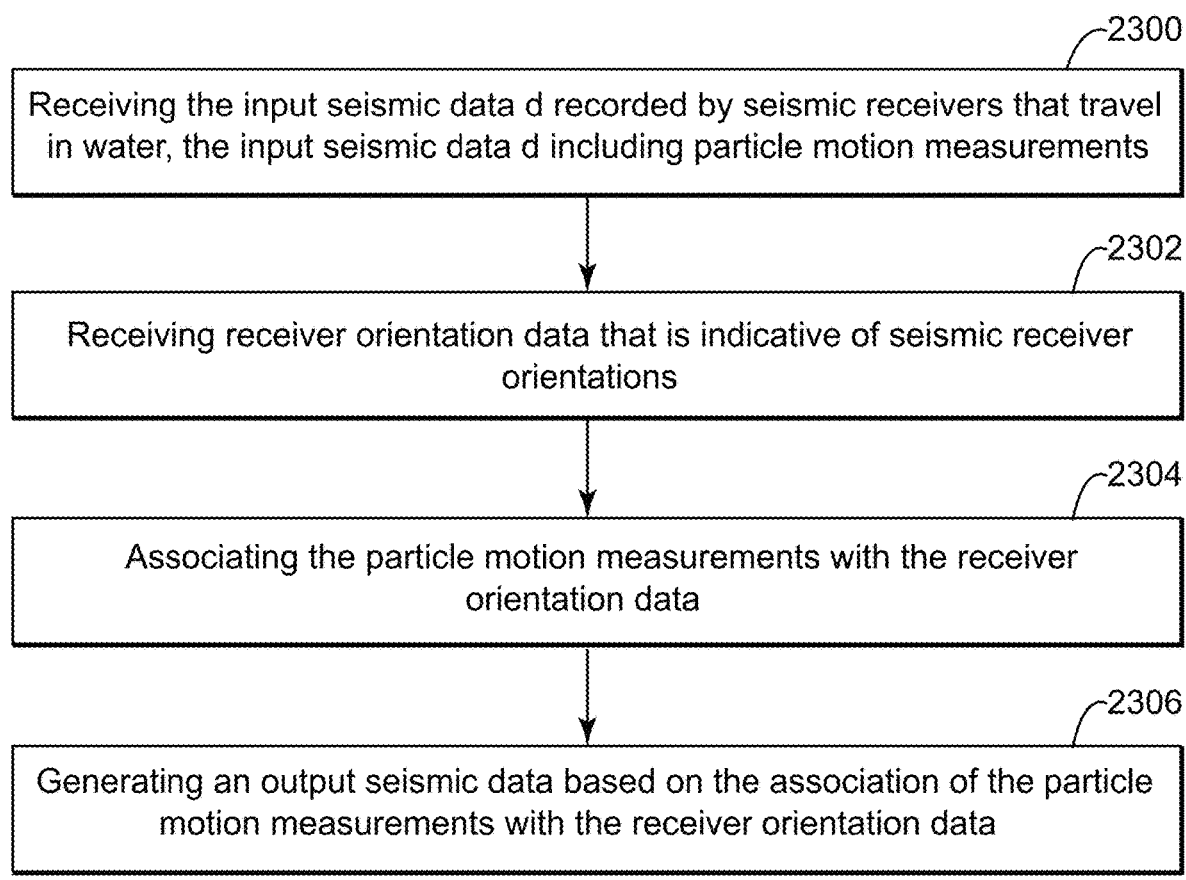

1. According to this embodiment, also illustrated in FIG. 23, there is a method for processing input seismic data d, the method including a step 2300 of receiving the input seismic data d recorded by seismic receivers that travel in water, the input seismic data d including particle motion measurements, a step 2302 of receiving receiver orientation data that is indicative of seismic receiver orientations, a step 2304 of associating the particle motion measurements with the receiver orientation data, and a step 2306 of generating an output seismic data based on the association of the particle motion measurements with the receiver orientation data. The seismic receiver orientations vary in time and the output seismic data includes a wavefield reconstruction of the input dataset.

2. The input seismic data further includes pressure measurements.

3. The output seismic data is related to pressure or particle motion measurements.

4. The wavefield reconstruction generates up-going wavefields.

5. The wavefield reconstruction generates down-going wave-fields.

6. The wavefield reconstruction generates up-going and down-going wave-fields.

7. The wavefield reconstruction of the input data is at the same positions as the input data.

8. The wavefield reconstruction reconstructs the wavefields at desired positions that are different from positions relating to input seismic data d.

9. The desired positions are at different depths to the input receivers.

10. The desired positions are in-between the receivers.

11. The desired positions are selected to match positions of receivers from another seismic survey.

12. The desired positions are equidistant from streamers on which the receivers are distributed.

13. The desired positions are distributed on a regular grid.

14. The seismic receiver orientations vary from receiver to receiver along a streamer and the receiver orientation data includes orientation information about each receiver.

15. The seismic receiver orientations vary from a group of receivers to another group of receivers along a streamer and the receiver orientation data includes orientation information about the group of receivers.

16. Receiver data and the receiver orientation data has been pre-processed with an initial receiver orientation rotation.

17. The receiver orientation data is constant for each trace.

18. The receiver orientation data varies during the recording of each trace.

19. The seismic receiver orientations are distributed along more than a vertical direction and a cross-line direction.

20. The seismic receiver orientations are substantially perpendicular to the streamer.

21. The input seismic data d is recorded in a time-space domain.

22. The method further comprises:
generating a model p to describe the input seismic data d; and
applying an L' transform to the model p to obtain the output seismic data.

23. The model p is generated in one of a radon domain, frequency-wave number domain, tau-p domain, parabolic domain, shifted hyperbola domain, singular value decomposition, rank reduction and curvelet domain.

24. The step of applying an L' transform also includes removing random, coherent or impulsive noise.

25. The coherent noise is cross-talk noise, interference noise or multiple energy.

26. The impulsive noise is cross-talk noise or interference noise.

27. An amount of noise is reduced by scaling or filtering energy associated with the model p prior to or during the application of the L' transform.

28. The L' transform also includes a receiver rotation or obliquity correction.

29. The output seismic data is subtracted from the input seismic data d to obtain data d' to be used for generating an image of a surveyed subsurface.

30. The output seismic data is directly used for generating an image of a surveyed subsurface.

Embodiment F

Figure 24:
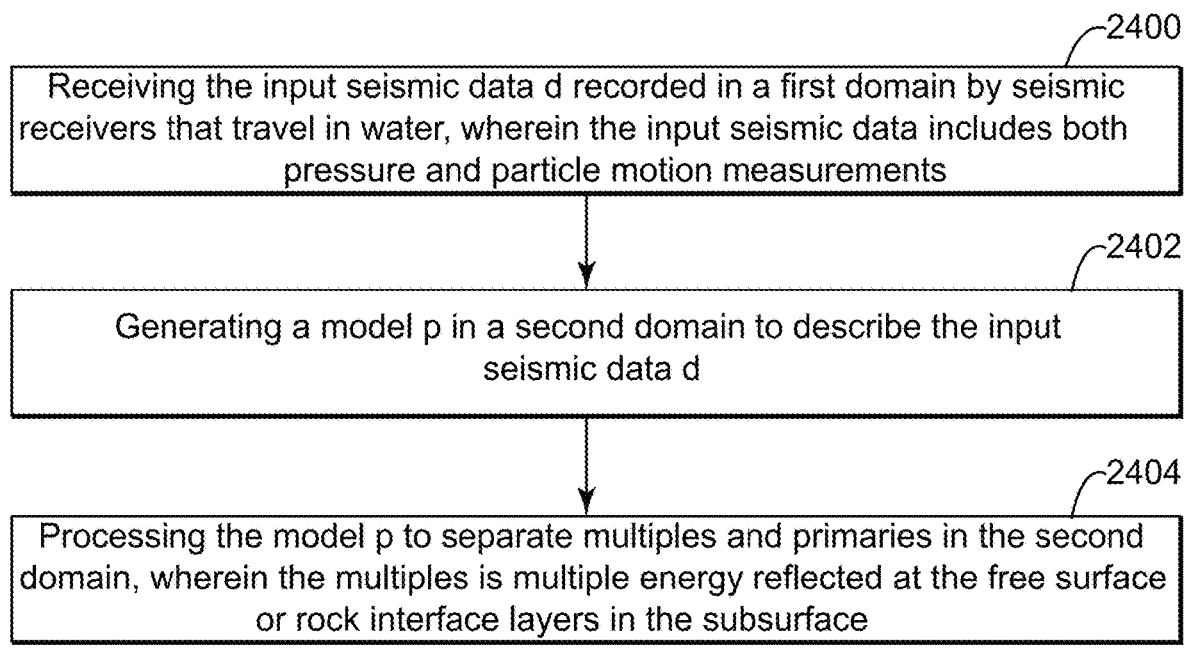

1. According to this embodiment, also illustrated in FIG. 24, there is a method for processing input seismic data d, the method including a step 2400 of receiving the input seismic data d recorded in a first domain by seismic receivers that travel in water, wherein the input seismic data includes both pressure and particle motion measurements, a step 2402 of generating a model p in a second domain to describe the input seismic data d, and a step 2404 of processing the model p to separate multiples and primaries in the second domain, wherein the multiples is multiple energy reflected at the free surface or rock interface layers in the subsurface.

2. The step of processing involves scaling down energy which is not multiple energy.

3. The step of processing involves scaling down energy which is multiple energy.

4. The step of processing involves applying deconvolution in the second domain to separate primary and multiples energy.

5. The step of processing involves applying a convolution in the second domain to estimate multiples energy.

6. The method further comprises:
transforming the multiples back to the first domain; and
subtracting the multiples from the input seismic data d to obtain final data d' based on which a final image of the earth is generated.

7. The method further comprises:
subtracting the multiples from data in the second domain; and
applying an operator L' to transform the data free of multiples from the second domain back to the first domain.

8. The first domain is a time-space domain.

9. The second domain is one of a radon domain, frequency-wave number domain, tau-p domain, parabolic domain, hyperbolic domain, singular value decomposition domain, rank reduction domain and curvelet domain.

10. The step of generating a model p comprises:
computing the model p by solving an inverse problem based on an L transform;
separating the primaries and the multiples in the second domain; and
applying an L' transform to the model p to obtain the multiples or the primaries in the first domain.

11. The L' transform includes wavefield separation.

12. The multiples or the primaries are generated at the same positions as the input data.

13. The multiples or the primaries are generated at positions different to the input data.

14. The multiples or the primaries are generated at positions to match positions of receivers from another seismic survey.

15. The positions are equidistant from input streamers on which the receivers are distributed.

16. The positions are distributed on a regular grid.

17. The positions are at different depths to the input data.

18. The positions are in-between the streamers.

19. The output data is indicative of pressure measurements.

20. The output data is indicative of particle motion measurements.

21. The output data is corrected for obliquity.

22. The output data is re-oriented.

Embodiment G

Figure 25:
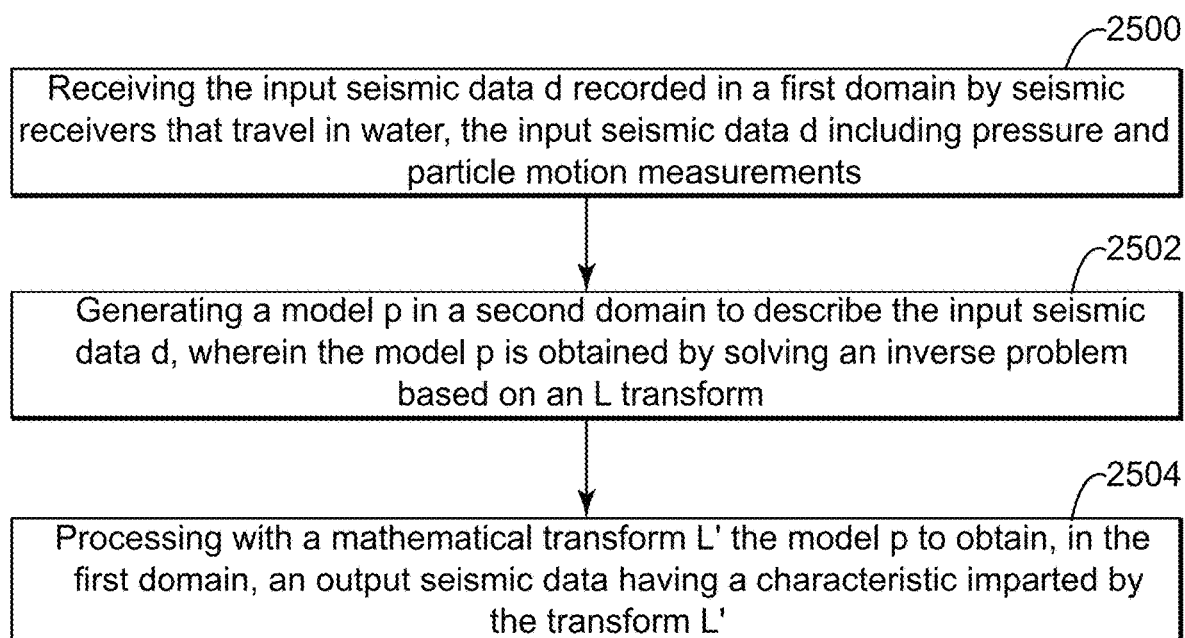

1. According to this embodiment, also illustrated in FIG. 25, there is a method for processing input seismic data d, the method including a step 2500 of receiving the input seismic data d recorded in a first domain by seismic receivers that travel in water, the input seismic data d including pressure and particle motion measurements, a step 2502 of generating a model p in a second domain to describe the input seismic data d, wherein the model p is obtained by solving an inverse problem based on an L transform, and a step 2504 of processing with a mathematical transform L' the model p to obtain, in the first domain, an output seismic data having a characteristic imparted by the transform L'. The mathematical transform L' is different from the mathematical transform L.

2. The input seismic data includes up-going and down-going wave-fields.

3. The input seismic data includes only an up-going wave-field.

4. The input seismic data includes only a down-going wave-field.

5. The output seismic dataset is indicative of pressure measurements.

6. The output seismic dataset is indicative of particle motion measurements with or without obliquity correction.

7. The characteristic is related to pressure wave-fields and/or particle motion wave-fields being interpolated among receiver positions and being substantially free of the up-going wave-fields.

8. The characteristic is related to pressure wave-fields and/or particle motion wave-fields substantially free of the down-going wave-field and interpolated among receiver positions.

9. The characteristic is related to pressure wave-fields and/or particle motion wave-fields being interpolated along streamers including the seismic receivers.

10. The interpolated data is indicative of hydrophone and particle motion data is summed to perform wavefield separation.

11. The characteristic is related to pressure wave-fields and/or particle motion wave-fields being calculated at a new datum relative to a datum of the seismic receivers.

12. Pressure wave-fields and/or particle motion wave-fields are spatially resampled at another new datum.

13. The characteristic is related to pressure wave-fields and/or particle motion wave-fields being wave-field separated and calculated at a new datum relative to a datum of the seismic receivers.

14. The method further comprises:
denoising the model p prior to applying the L' transform.

15. The characteristic is related to pressure wave-fields and/or particle motion wave-fields being interpolated at positions in-between the input seismic receivers.

16. The characteristic is related to pressure wave-fields and/or particle motion wave-fields being interpolated at positions selected to match positions of receivers from another seismic survey.

17. The positions are equidistant from input streamers on which the receivers are distributed.

18. The positions are distributed on a regular grid.

19. The first domain is a time-space domain and the second domain is one of a radon domain, frequency-wave number domain, tau-p domain, parabolic domain, hyperbolic domain, singular value decomposition domain, rank reduction domain and curvelet domain.

20. The seismic dataset indicative of up-going and down-going wave-fields is used for generating a final image of a surveyed subsurface.

Embodiment H

Figure 26:
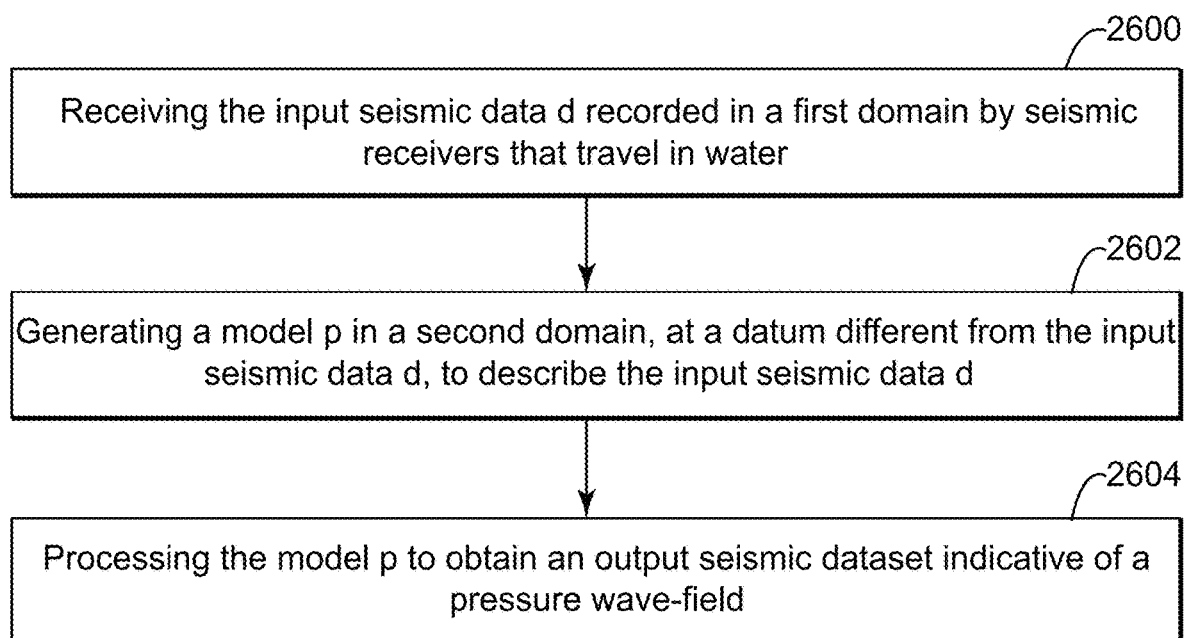

1. According to this embodiment, also illustrated in FIG. 26, there is a method for processing input seismic data d, the method including a step 2600 of receiving the input seismic data d recorded in a first domain by seismic receivers that travel in water, a step 2602 of generating a model p in a second domain, at a datum different from the input seismic data d, to describe the input seismic data d, and a step 2604 of processing the model p to obtain an output seismic dataset indicative of a pressure wave-field.

2. The input seismic data d includes only pressure measurements or pressure and particle motion measurements.

3. The output seismic dataset is indicative of a pressure measurement or a particle motion measurement.

4. The first domain is a time-space domain.

5. The second domain is one of a radon domain, frequency-wave number domain, tau-p domain, parabolic domain, shifted hyperbola domain, singular value decomposition domain, rank reduction domain and curvelet domain.

6. The step of processing the model p comprises:
applying an L' transform to the model p to obtain the output seismic dataset.

7. The L' transform does not include vector rotation or obliquity correction.

8. The L' transform also includes vector rotation or obliquity correction.

9. The step of processing the model p comprises:
applying an L' transform to the model p to obtain an output dataset containing up-going and down-going energy.
10. The step of processing the model p comprises:
applying an L' transform to the model p to obtain an output dataset substantially free of down-going energy.
11. The step of processing the model p comprises:
applying an L' transform to the model p to obtain an output dataset substantially free of up-going energy.
12. The step of processing also includes removing random, coherent or impulsive noise.
13. The coherent noise is cross-talk noise, interference noise or multiple energy.
14. The impulsive noise is cross-talk noise or interference noise.
15. An amount of noise is reduced by scaling or filtering prior to or during the application of the L' transform.
16. The output seismic dataset indicative of the pressure wave-field is generated at the same positions as the input seismic data.
17. The output seismic dataset indicative of the pressure wave-field is generated at positions different from the input seismic data.
18. The positions are at different depths than the input seismic data.
19. The positions are designed to match positions of receivers from another seismic survey.
20. The positions are equidistant from input streamers on which the receivers are distributed.
21. The positions are on a regular grid.
22. The output seismic dataset indicative of the pressure wave-field is subtracted from the input seismic data d to obtain data d' to be used for generating a final image of a surveyed subsurface.
23. The output seismic dataset indicative of the pressure wave-field is added to the input seismic data d to obtain data d' to be used for generating a final image of a surveyed subsurface.
24. The seismic dataset indicative of the pressure wave-field is directly used for generating a final image of a surveyed subsurface.
25. The step of generating a model is based on an L transform which incorporates a differentiation in time or space.
26. The step of generating a model is based on an L transform which includes a frequency filter term to account for different signal to noise ratios for pressure and particle motion data.
27. Measurements of the particle motion receivers are substantially orientated vertically with gravity.

The disclosed exemplary embodiments provide a computing device, software instructions and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for exploration of natural resources in a surveyed subsurface, the method comprising:
receiving the input seismic data d recorded in a first domain by seismic receivers that travel in water, the input seismic data d including pressure data and particle motion data;
generating a model p in a second domain, which is different from the first domain, to describe the input seismic data d;
processing the model p to generate an output seismic dataset with attenuated noise; and
generating an image of the surveyed subsurface based on the output seismic dataset with attenuated noise for locating the natural resources in the surveyed subsurface,
wherein
the generating of the model p includes computing the model p by solving an inverse problem based on an L transform.

2. The method of claim 1, wherein the processing includes removing the noise in the model p by scaling.

3. The method of claim 1, wherein the processing includes removing the noise based on a non-coherent nature of the model p in the second domain.

4. The method of claim 1 wherein the processing includes removing the noise by controlling sparseness weights when an L transform is applied to the model p.

5. The method of claim 1, wherein
the processing of the model p includes applying an L' transform to the model p to obtain the output seismic dataset with attenuated noise.

6. The method of claim 5, wherein the L' transform includes at least one of model masking, scaling or filtering energy associated with the model p.

7. The method of claim 6, wherein the L' transform further includes a receiver rotation and an obliquity correction, which is defined by an angle between a respective wave-field propagation direction and a receiver orientation.

8. The method of claim 1, wherein the seismic receivers are towed by a first vessel and the noise relates to cross-talk due to a second vessel.

9. The method of claim 1, wherein the first domain is a time-space domain, and the second domain is one of a radon domain, a frequency-wave number domain, a singular value decomposition domain, a rank reduction domain, a slowness-shotpoint domain and a curvelet domain.

10. The method of claim 1, wherein the output seismic dataset corresponds to same positions as the input seismic data.

11. The method of claim 1, wherein the output seismic dataset indicates pressure values.

12. The method of claim 1, wherein the output seismic dataset is indicative of particle motion values.

13. The method of claim 1, wherein the processing includes an up-going and down-going wavefield separation.

14. A computing device for exploration of natural resources in a surveyed subsurface based on processing input seismic data d, the computing device comprising:
  an interface configured to receive the input seismic data d associated with the surveyed subsurface and recorded in a first domain by seismic receivers that travel in water, the input seismic data d including pressure data and particle motion data; and
  a processor connected to the interface, the processor being configured
    to generate a model p in a second domain, which is different from the first domain, to describe the input seismic data d, wherein the processor computes the model p by solving an inverse problem based on an L transform,
    to process the model p to generate an output seismic dataset with attenuated noise, and
    to generate an image of the surveyed subsurface based on the output seismic dataset for locating the natural resources in the surveyed subsurface.

15. A non-transitory computer readable medium including computer executable instructions, wherein, when the instructions are executed by a processor, the processor performs a method for exploration of natural resources in a surveyed subsurface, the method comprising:
  receiving the input seismic data d recorded in a first domain by seismic receivers that travel in water, the input seismic data d including pressure data and particle motion data;
  generating a model p in a second domain, which is different from the first domain, to describe the input data d;
  processing the model p to generate an output seismic dataset with attenuated noise; and
  generating an image of the surveyed subsurface based on the output seismic dataset with attenuated noise for locating the natural resources in the surveyed subsurface
  wherein
  the generating of the model p includes computing the model p by solving an inverse problem based on an L transform.

* * * * *